United States Patent
VanderSpek et al.

(10) Patent No.: US 10,067,946 B2
(45) Date of Patent: *Sep. 4, 2018

(54) NEXT-LEVEL MULTI-LEVEL DEDUPLICATION

(71) Applicant: Exagrid Systems, Inc., Westborough, MA (US)

(72) Inventors: Adrian T. VanderSpek, Worcester, MA (US); Daniel P. Martinelli, Hopkinton, MA (US); David G. Therrien, Nashua, NH (US)

(73) Assignee: Exagrid Systems, Inc., Westborough, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/482,376

(22) Filed: Apr. 7, 2017

(65) Prior Publication Data

US 2017/0212907 A1    Jul. 27, 2017

Related U.S. Application Data

(63) Continuation-in-part of application No. 14/625,112, filed on Feb. 18, 2015, now Pat. No. 9,703,797.

(51) Int. Cl.
*G06F 17/30* (2006.01)
*G06F 11/14* (2006.01)

(52) U.S. Cl.
CPC .. *G06F 17/30156* (2013.01); *G06F 17/30153* (2013.01); *G06F 17/30162* (2013.01); *G06F 17/30516* (2013.01); *G06F 11/1453* (2013.01)

(58) Field of Classification Search
USPC ................................ 707/609, 601, 692, 687
See application file for complete search history.

(56) References Cited

U.S. PATENT DOCUMENTS

| | | |
|---|---|---|
| 8,396,841 B1 | 3/2013 | Janakiraman |
| 8,412,848 B2 | 4/2013 | Therrien et al. |

(Continued)

FOREIGN PATENT DOCUMENTS

EP    2698732 A1    2/2014

OTHER PUBLICATIONS

Dirk Mester et al., "Multi-Level Comparision of Data Deduplication in a Backup Scenario", May 2009.*

(Continued)

*Primary Examiner* — Hung T Vy
(74) *Attorney, Agent, or Firm* — Mintz Levin Cohn Ferris Glovsky and Popeo, P.C.

(57) ABSTRACT

A method, a system, and a computer program product for performing next level multi-level deduplication. A first zone stamp for a first data zone is generated and compared to a second zone stamp representing a second data zone, where the zones are first level data zones. The first and second data zones are deduplicated when the first zone stamp matches the second zone stamp. A second-level first zone stamp is selected when there is no match between first and second zone stamps. The second-level first zone stamp, representing a second-level first data zone in the first data zone, is compared to the second zone stamp and/or a second-level second zone stamp representing a second-level second data zone. The second-level first zone and one of the second data zone and the second-level second zone are deduplicated when the second-level first zone stamp matches one of the second zone stamp and the second-level second zone stamp.

24 Claims, 15 Drawing Sheets

(56) References Cited

U.S. PATENT DOCUMENTS

| | | | |
|---|---|---|---|
| 9,703,797 B2 | 7/2017 | Therrien et al. | |
| 2010/0125553 A1* | 5/2010 | Huang | G06F 11/1453 |
| | | | 707/661 |
| 2011/0231362 A1* | 9/2011 | Attarde | G06F 11/3442 |
| | | | 707/609 |
| 2012/0036113 A1 | 2/2012 | Lillibridge et al. | |
| 2013/0290474 A1* | 10/2013 | Therrien | H03M 7/3084 |
| | | | 709/216 |
| 2015/0134623 A1* | 5/2015 | Liu | G06F 17/30156 |
| | | | 707/692 |
| 2017/0277711 A1 | 9/2017 | Therrien et al. | |

OTHER PUBLICATIONS

European Search Report for EP Application No. 16156400.0 dated Jul. 21, 2016.

* cited by examiner

FIG. 4b.

| Zone Level | Backup Region ID | Offset | Size | Stamp |
|---|---|---|---|---|
| 1 | 1234567 | 0 | 8000000 | AGDHE |
| 1 | 1234567 | 8000000 | 10000000 | EEEKLCB |
| 1 | 1234567 | 18000000 | 10000000 | GGHDABC |
| 1 | 1234567 | 28000000 | 1000000 | FGAGCBLLL |
| 1 | 9876543 | 0 | 10000000 | AAAABCDEE |

450

NEXT-LEVEL MULTI-LEVEL DEDUPLICATION

CROSS-REFERENCE TO RELATED APPLICATIONS

The present application claims priority to and is a continuation-in-part of U.S. patent application Ser. No. 14/625,112 to Therrien et al., filed Feb. 18, 2015, and incorporates its disclosure herein by reference in its entirety.

TECHNICAL FIELD

In some implementations, the current subject matter relates to data processing, and in particular, to next-level multi-level deduplication of data.

BACKGROUND

Many information technology ("IT") operations and activities can be scheduled to run one or more times within some periodic cycle (daily, weekly, monthly, quarterly, etc.). One such application can be data backup. Data backups can be essential to preserving and recovery of data in the event of data loss, for example. To avoid interfering with daily user activities, data backups can be performed during periods of low application server utilization, typically, on weeknights and on weekends. The backup job workload can be the same or different depending on how much data needs to be protected and when. In some applications, backup jobs can be scheduled and/or configured using a commercial backup application, an operating system shell scripting, and/or in any other manner.

Backup application employ a plurality of techniques to manage data designated for backup. One such technique includes deduplication. Deduplication can be used to eliminate redundancy in the execution of periodically executed backup tasks. In some cases, deduplication can reduce data storage capacity consumption as well as an inter-site network bandwidth. It can do so by identifying and eliminating similar and/or identical sequences of bytes in a data stream. Deduplication can also include computation of cryptographic and/or simple hashes and/or checksums, as well as one or more forms of data compression (e.g., file compression, rich media data compression, delta compression, etc.).

Deduplication involves identifying similar or identical patterns of bytes within a data stream, and replacing those bytes with fewer representative bytes. By doing so, deduplicated data consumes less disk storage capacity than data that has not been deduplicated and when the data stream must be transmitted between two geographically separate locations, consumes less network bandwidth. Adaptive deduplication strategies combine inter-file and/or intra-file discovery techniques to achieve the aforementioned goals.

Deduplication can be used to reduce the amount of primary storage capacity that is consumed by email systems, databases and files within file systems. It can also be used to reduce the amount of secondary storage capacity consumed by backup, archiving, hierarchical storage management (HSM), document management, records management and continuous data protection applications. In addition, it can be used to support disaster recovery systems which provide secondary storage at two or more geographically dispersed facilities to protect from the total loss of data when one site becomes unavailable due to a site disaster or local system failure. In such a case, deduplication helps to reduce not only the amount of data storage consumed, but also the amount of network bandwidth required to transmit data between two or more facilities.

Conventional deduplication techniques apply one level of deduplication to backup streams, and do not take advantage of additional deduplication reductions when compared with multi-level deduplication. Such techniques are typically limited to optimization of bandwidth or capacity at one level, but do not provide optimization at the higher levels and thus, do not provide the requisite space or bandwidth savings. In that regard, such systems tend to consume a significant amount of network bandwidth and storage capacity, thereby increasing operational costs and reducing efficiency of networks and data storage facilities. Thus, there is a need for a deduplication mechanism that is capable of providing multi-level deduplication of data zones within an incoming data stream as well as improving the deduplication ratio.

SUMMARY

In some implementations, the current subject matter relates to a computer implemented method for next level multi-level deduplication. The method can include generating a first zone stamp for a first data zone in a plurality of data zones contained in at least one data stream and comparing the first zone stamp to a second zone stamp. The second zone stamp can represent a second data zone. The first and second data zones can be first level data zones. The method can further include deduplicating the first data zone and the second data zone upon determination that the first zone stamp matches the second zone stamp and selecting a second-level first zone stamp upon determination that the first zone stamp does not match the second zone stamp. The second-level first zone stamp can represent a second-level first data zone contained with the first data zone. The method can also include comparing the second-level first zone stamp to at least one of the second zone stamp and a second-level second zone stamp. The second-level second zone stamp can represent a second-level second data zone. The method can perform deduplicating the second-level first zone and at least one of the second data zone and the second-level second zone based on a determination that the second-level first zone stamp matches at least one of the second zone stamp and the second-level second zone stamp.

In some implementations, the current subject matter can include one or more of the following optional features. The deduplication process can include delta-compressing a zone in the plurality of zones, and transmitting the delta-compressed zone across a network from a storage location to another storage location.

In some implementations, upon determination that a zone stamp of a zone does not match any other zone stamp, the method can further include data-compressing the zone, and transmitting the data-compressed zone across a network from a storage location to another storage location.

In some implementations, the generation of the zone stamp can include processing the data stream to determine all zone levels contained within the data stream. All zone levels for the data stream can be determined simultaneously. Further, for each zone, the method can store a zone entry in a table. The zone entry can include a starting location and a size of the zone, a zone stamp identifying the zone based on the starting location and the size of the zone, an identifier identifying location of the zone of the at least one data stream, and a data stream identifier.

In some implementations, upon determination that the first zone stamp matches the second zone stamp, the method can perform delta-compressing the first zone, and storing the delta-compressed first zone.

In some implementations, each zone can have a fixed length. Alternatively, each zone can have a variable length.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 4b illustrates an exemplary entry in a stamp table, according to some implementations of the current subject matter;

DETAILED DESCRIPTION

Figure 1:
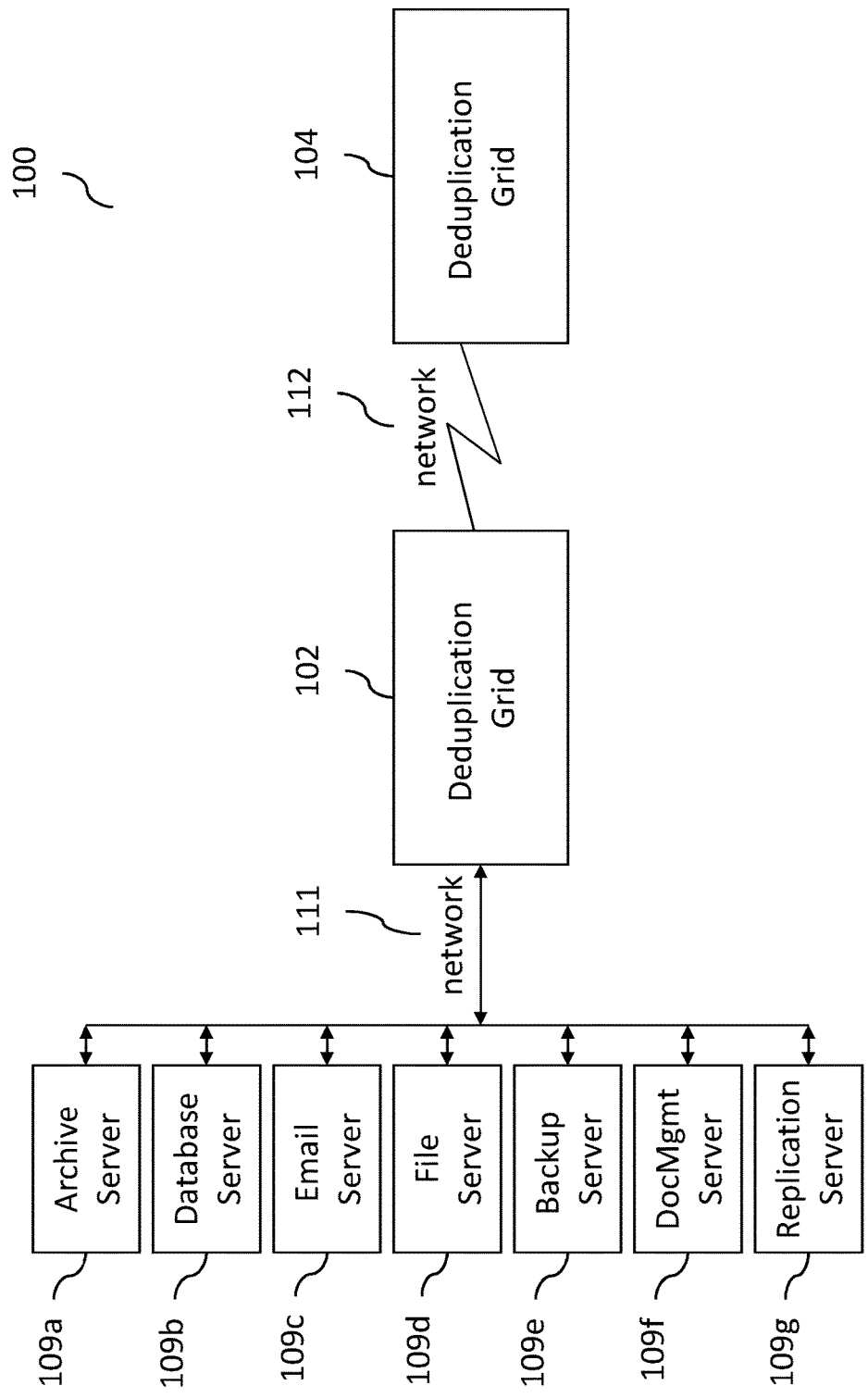
FIG. 1 illustrates an exemplary data deduplication system for deduplicating a stream of data received from a variety of sources, according to some implementations of the current subject matter.

To address these and potentially other deficiencies of currently available solutions, one or more implementations of the current subject matter provide methods, systems, articles or manufacture, and the like that can, among other possible advantages, provide for a multi-level deduplication of data.

In some implementations, the current subject matter can perform processing of one or more streams of data (e.g., backup streams of data or any other data streams). The data stream can include a plurality data zones and each zone can be associated with a zone stamp that can identify that zone. The current subject matter can generate such zones and zone stamps based on the analysis of the received data steam(s). The zone stamps can be compared to one another (whether or not the zones are within the same data stream or not). In some implementations, the current subject matter can compare the zone stamps for zones at corresponding zone levels based on a determination that a zone stamp of a zone of a preceding zone level is not similar to another zone stamp of another preceding zone level. The zone at the preceding zone level can include at least one zone of a next zone level having a size smaller than or equal to a size of the zone of the preceding zone level. Once the comparison is completed, the current subject matter can perform deduplication of the zones based on a determination that one zone stamp is similar to another zone stamp.

Deduplication can reduce data storage capacity consumption and/or inter-site network bandwidth requirements. Further, data deduplication can reduce an amount of data storage capacity that can be consumed by primary, backup, archive, etc. data storage systems. Further, deduplication can be effective in eliminating redundant data from being transferred across cost and/or bandwidth limited inter-site networks. Deduplication methods can be executed within and/or among a logical collection of internetworked compute and/or data storage servers, which can be referred to as grid servers. Grid servers can receive incoming stream(s) of data for deduplication, store data locally, and/or optionally replicate and store remotely for some period of time. From this incoming data, zones can be created. Zones can be contiguous and/or non-contiguous segments of the incoming data, e.g., entire files, an aggregation of multiple files, etc. For each zone in a data stream, a zone stamp can be generated and/or computed based on a content of the zone's data bytes.

A zone stamp can be a string containing up to 64 characters (and/or any other number of characters), which, in some exemplary implementations, can be smaller than or equal to the size of the zone it represents. Because of the smaller size of zone stamps, the entire list of zone stamps can be stored in a main memory (e.g., a high-speed memory location) to allow them to be quickly and/or efficiently compared to each other in order to identify zones whose content is similar and/or identical and/or substantially identical to one another. Such zones of data can then be delta compressed against each other so that the zones can be replaced by one unaltered zone and another delta compressed zone that can contain just the bytes that are different between the zones.

In some implementations, the current subject matter can improve deduplication process by improving a ratio of data stored and transmitted among a plurality of inter-networked servers that can be communicatively coupled using a deduplication server network or a grid. The current subject matter can optimize performance, scalability, efficiency, etc. while minimizing storage capacity consumption, data center power consumption, cooling requirements, rack space, network bandwidth consumption, etc. In some implementations, the current subject matter, as part of the above-referenced matching process, can identify zones that do not match other zones of similar size and/or content (and/or any other characteristic) within a particular level of deduplication (e.g., "level-1" zones). The unmatched zones can then be broken up into further smaller sized zones to determine whether there is a match among the zones within that zone or with other zones. The smaller size zones would be matched to zones that have similar characteristics. These smaller size zones would be matched at a lower level, e.g., "level-2". This process can continue indefinitely and/or until a predetermined level of zones have been reached (e.g., size of a zone).

In some implementations, the current subject matter can include one or more of the following advantages. The current subject matter can provide a multi-tiered deduplication of data that can improve deduplication ratio of stored data which can reduce grid server storage consumption and/or can reduces wide area network ("WAN") bandwidth consumed by the plurality of grid servers in the grid. Further, the current subject matter can process as much of the incoming backup data stream at larger zone sizes first and re-process those zones that failed to match at the larger zone size into smaller zones that are more likely to match. Additionally, the current subject matter can allow for a reduced storage capacity consumption that can lead to reduced data center power consumption, rack space, cooling requirements, etc.

I. Deduplication System

FIG. 1 illustrates an exemplary data deduplication system 100 for deduplicating a stream of data received from a variety of sources 109 (a, b, c, d, e, f, g). The source 109 can include an archive server 109a, a database server 109b, an email server 109c, a file server 109d, a backup server 109e, a document management server 109f, a replication server 109g, as well as any other application, business object, business process, business process application, server, software, hardware, etc. The system 100 can further include a deduplication grids 102, 104 and networks 111, 112. The network 111 can communicatively couple the deduplication grid 102 and source 109 and the network 112 can communicatively couple the deduplication grid 102 and the deduplication grid 104. In some implementations, the deduplication grid 102 can be located in the same physical location as the sources 109. Alternatively, the grid 102 can be remote from the sources 109. The grid 104 can be remotely located from the sources 109 and/or grid 102. For example, the grid 104 can be a backup site for the data received from the source 109.

The grids 102 and/or 104 can include one or more computing devices, systems, servers, hardware, software, and/or any combination of hardware and/or software, which can be communicatively coupled with one another using various wireless and/or wired connections, networks, etc. The networks 111, 112 can be any wireless and/or wired networks, wide area networks ("WAN"), metropolitan area networks ("MAN"), local area networks ("LAN"), Internet, extranet, intranet, as well any other type of network.

In some embodiments, the deduplication grid 102 can receive data stream(s) from sources 109 and can perform an initial deduplication of the received data. Additionally, the grid 102 can also perform reconstituting original un-deduplicated data, when requested to do so by source(s) 109. The deduplicated data can be stored in a storage local to the grid 102 (not shown in FIG. 1). The deduplicated data can be sent to grid 104 and stored a storage local to the grid 104 (not shown in FIG. 1). For example, critical application data can be stored at a local facility (e.g., as represented by the grid 102) and at a geographically distant remote facility (e.g., as represented by the grid 104) in order to provide for a full recovery in the event of system failure, site disaster, or any other unprecedented condition or event.

Figure 2:
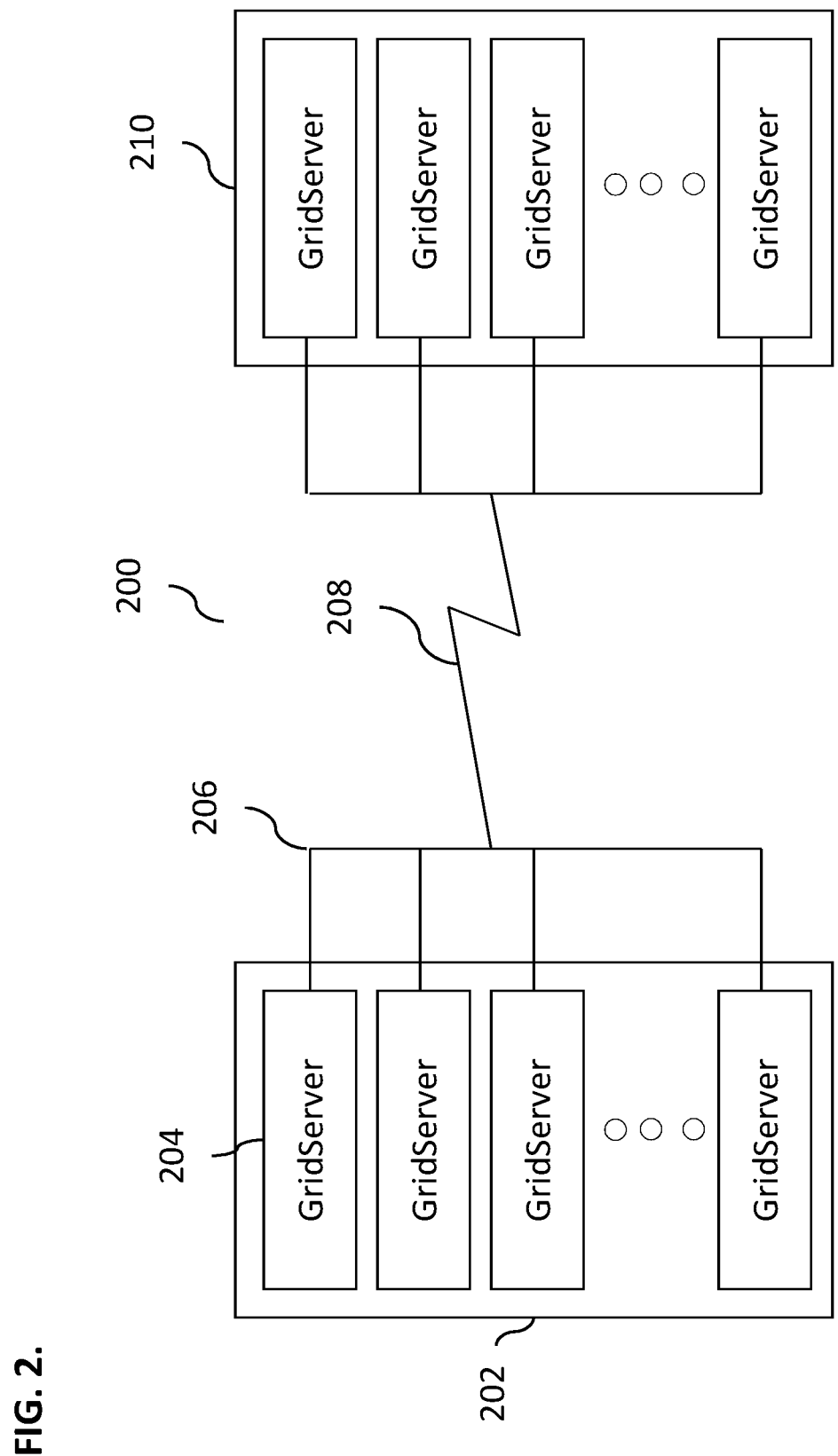
FIG. 2 illustrates an exemplary network, according to some implementations of the current subject matter.

FIG. 2 illustrates an exemplary network 200, according to some implementations of the current subject matter. The network 200 can include a plurality of network sites 202 and 210 are shown in FIG. 2), each having a deduplication grid containing a plurality of deduplication grid servers 204. The grid servers 204 within each site 202 and 210 can be communicatively coupled using any wireless and/or wired networks, wide area networks ("WAN"), metropolitan area networks ("MAN"), local area networks ("LAN"), Internet, extranet, intranet, as well any other type of network 206. The sites 202 and 210 can be communicatively coupled using any wireless and/or wired networks, wide area networks ("WAN"), metropolitan area networks ("MAN"), local area networks ("LAN"), Internet, extranet, intranet, as well any other type of network 208.

In some implementations, the current subject matter can provide a multi-stage and/or multi-level deduplication of streams of data, which can be received by one or more servers in the network 200. In some implementations, the data stream that can be received can be split into a plurality of zones that can be matched against one another in order to determine whether or not zones are similar to one another, identical, and/or substantially similar (e.g., zones that include similar data content). Zones having similar, identical, and/or substantially similar data content can be deduplicated. Other zones that are not similar, identical, and/or substantially similar to any other zone in the received data stream can be further processed. Such further processing can involve splitting the zone into further zones (or "next-level") zones to determine whether such smaller-size zones include data content that is similar, identical, and/or substantially similar to other small-size zone(s) within the bigger zone. Smaller-size zones that have data content that is similar, identical, and/or substantially identical can be deduplicated. For the remaining smaller-size zones, the above process can be repeated to any desired level of granularity. In some implementations, the zones can be compared to other zones within the same or different data streams, zones, and/or smaller zones. In some implementations, zones at one level can be compared with zones at the same level only. The deduplicated zones can be delta-compressed and transmitted across network 200. Once the desired level of granularity is reached, the zone(s) that do not match any other zones can be data-compressed for the purposes of transmission across network 200.

In some exemplary implementations, current subject matter's deduplication process can split an incoming data stream (e.g., a backup data stream) into level-1 zones. Each level-1 zone can have a predetermined "average" or "target" size. By way of a non-limiting example, each level-1 zone can be approximately 8 megabytes ("MB") in size. In some implementations, each level-1 zone can have a fixed and/or variable length. The deduplication process can then proceed to compare level-1 zones with other level-1 zones using zone stamps created for each zone. The level-1 zones that have similar, identical, and/or substantially identical content and/or zone stamps can be matched against one another and then can be delta-compressed together. This can reduce local and/or remote storage capacity as well as inter-site bandwidth of the network 200. Upon completion of level-1 zone matching, the deduplication process can determine whether there remain any level-1 zones that have not been matched with any other level-1 zones in the data stream (or data streams). The deduplication process can then proceed to perform further splitting up of these level-1 zones into level-2 zones, where level-2 zones can have a smaller size than the level-1 zones and repeating the above process for level-2 zones. In some implementations, level-2 zones can be created at the same time as level-1 zones, such as for efficiency purposes.

For illustrative purposes only, an approximately 8 MB level-1 zone can be split into smaller-sized, approximately 512 kilobyte ("KB"), level-2 zones. Each such level-2 zone can have a fixed and/or variable length. The deduplication process can then compare level-2 zones with other level-2 zones (within the same and/or different data stream and/or within the same and/or different level-1 zone).

This process can compare zone stamps generated for each level-2 zone. The sizes of smaller zones can be selected based on a size of the larger zone in which the smaller zones are contained, and/or selected as desired. In the example above, a level-1 ~8 MB zone can produce approximately sixteen ~512 KB level-2 zones. Each of the level-2 zones has a level-2 stamp that can be compared against all other level-2 zone stamps to determine level-2 zones that are similar, identical, and/or substantially similar. Upon that determination, such zones can be delta compressed to reduce data storage capacity and/or inter-site networking bandwidth of the network 200. Level-2 zones that do not match any other level-2 zones can be further split into level-3 zones and the above process can be repeated. For example, the approximately 512 KB level-2 zones can be split into smaller-sized approximately 32 KB level-3 zones. Each such level-3 zone can have a fixed and/or variable length. The level-3 zones can then be compared against other level-3 zones by comparing their respective level-3 zone stamps with one another. In the above example, a level-2 512 KB zone can produce approximately sixteen 32 KB level-3 zones. Each of these level-3 zones can have a corresponding level-3 zone stamp that can be compared against other level-3 zone stamps to determine level-3 zones for delta compression.

In some implementations, the above process can be performed to any desired level n, where n=1, 2, 3, . . . N, N being an integer. Further, the splitting of the zones can be performed to any desired size.

In some implementations, the processing of a data stream can include at least one of the following operations, parallel backup stream splitting, stamp creation (which can be performed at multiple zone levels), stamp matching (which can be performed at each zone level), and/or delta-compression, storage, and replication of zones at different zone levels. Each of these operations can be performed in parallel, sequentially, and/or in any other order, and are discussed below in further detail.

II. Parallel Backup Stream Splitting and Stamp Creation

In some implementations, the current subject matter can perform parallel splitting of a stream of data into a plurality of zones. As the stream of data is split into a plurality of zones, a zone stamp can be generated for each zone. The zone stamp can identify its corresponding zone, where the zone stamp can include a sequence of contiguous characters representing a portion of data in the zone. The order of characters in the zone stamp can correspond to the order of data in the zone. As stated above, zone stamps of zones can be compared to one another to determine whether they are similar, identical, and/or substantially similar to one another (and thus, the zones can be determined to be similar, identical, and/or substantially similar) to ascertain whether their corresponding zones are candidates for deduplication.

Figure 3:
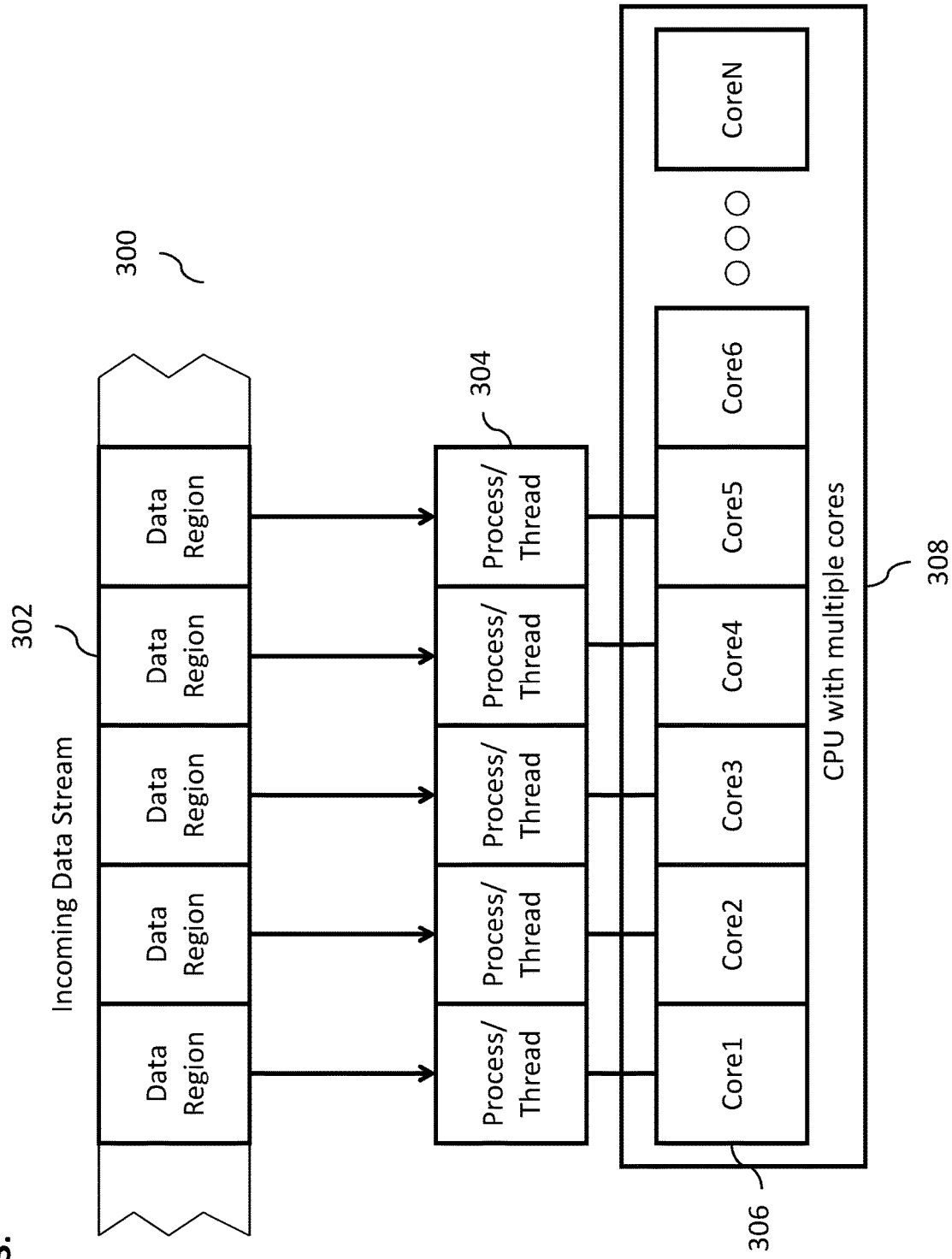
FIG. 3 illustrates an exemplary process for performing processing of a data stream, according to some implementations of the current subject matter.

FIG. 3 illustrates an exemplary process 300 for performing processing of a data stream, according to some implementations of the current subject matter. A stream of data 302 can include one or more data regions. In some exemplary implementations, the data regions can be regions that can be designated for a backup. The processing of the data stream 302 can be performed by one or more of the grid servers 204 as shown in FIG. 2. Each such grid server 204 can include a central processing unit 308 that can further include a plurality of processing cores 306 (e.g., Core1, Core2, . . . CoreN) that can perform processing of a plurality of processes/threads 304 corresponding to respective data regions within the data stream 302. Use of the plurality of processing cores 306 can allow the server 202 to perform parallel processing of the different data regions 302. This can improve utilization of resource of each grid server 204 shown in FIG. 2 and can further improve processing speed of data.

Figure 4A:
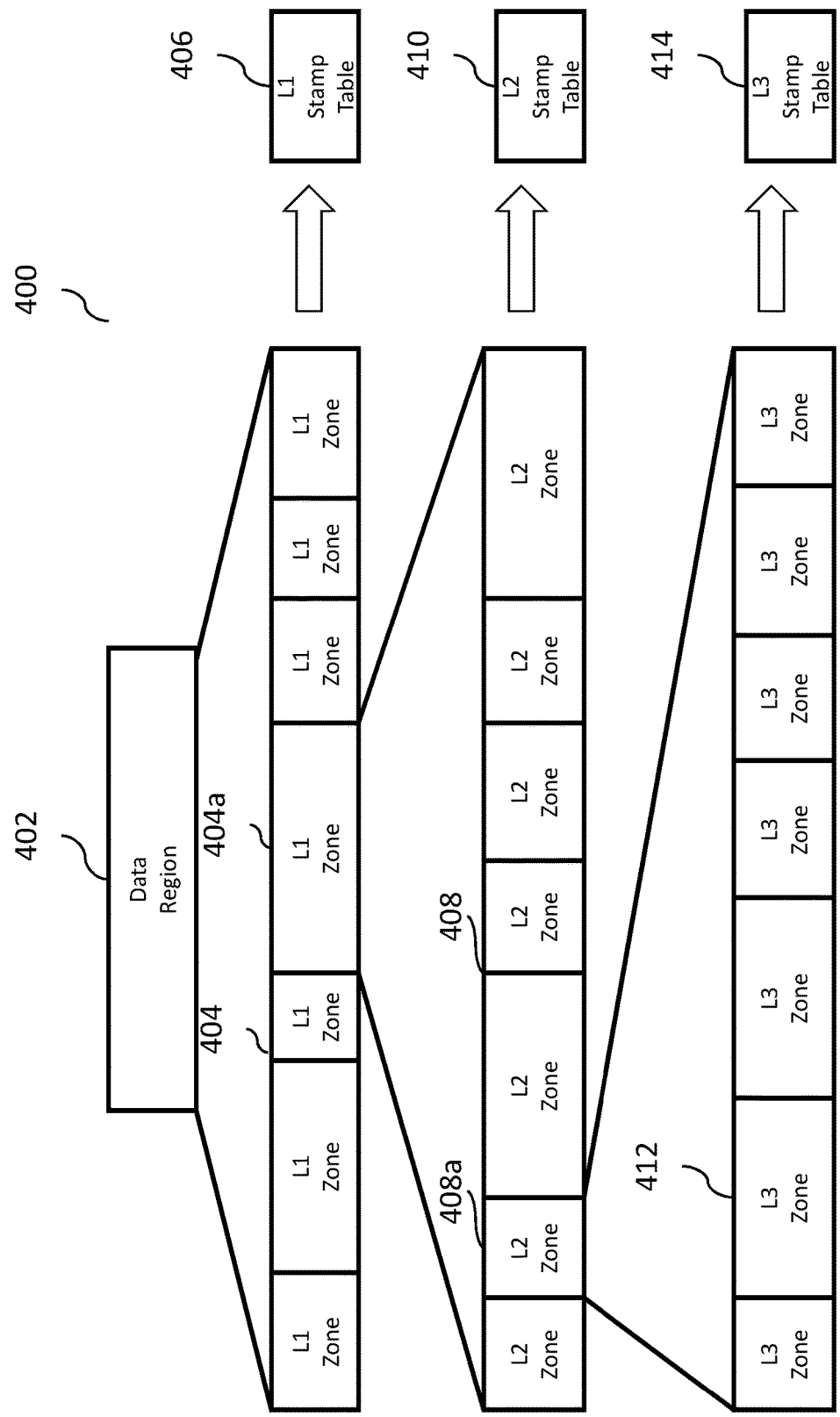
FIG. 4a illustrates exemplary data regions within an incoming data stream, according to some implementations of the current subject matter.

In some exemplary implementations, an incoming data stream 302 can be very large, e.g., hundreds of gigabytes to terabytes in size. This can be typical of a backup data stream. As shown in FIG. 4a, the data regions 402 of the incoming data stream 302 (shown in FIG. 3) can be subdivided into a plurality of zones 404. Zones 404 can be level-1 zones. The size of the zones 404 can be pre-determined and/or selected as desired. In some exemplary implementations, each zone 404 can be approximately 8 MB in size and can have a variable and/or fixed length. Thus, a multi-terabyte backup stream can be split into much larger 100 gigabyte ("GB") data regions to allow independent and/or parallel processing of the data stream using multiple threads running on independent multi-core processors 306 (shown in FIG. 3). In some implementations, the cores 306 can be within the same central processing unit ("CPU" (chip)) and/or can be separate multiple processors.

Referring back to FIG. 4a, each level-1 zone 404 can be split into a plurality of level-2 zones 408. Such splitting of level-1 zones into level-2 zones can be performed after a determination that a zone stamp for a particular level-1 zone 404a does not match a zone stamp of any other zone 404. In some implementations, level-2 zones and/or their representative zone stamps can be created at the same time as level-1 zones and level-1 zone stamps. Level-3 zones and their zone stamps can also be created at the same time. Alternatively, all or a determined portion of level-1 zones 404 can be split into level-2 zones. After splitting of level-1 zones, zone stamps for level-2 zones 408 can be generated and compared to one another. Any level-2 zones that have zone stamps that do not match other zone stamps can be further split into level-3 zones 412. Each lower level zone can be contained within a larger level zone. In some implementations, each zone stamp can be compared with zone stamps for zones that are located within the same level either within the same and/or different higher level zones and/or within the same and/or different data streams.

Each zone 404, 408, 412 can be defined by a particular starting location and an ending location and/or starting location and/or size of the zone. The starting and/or ending locations of a zone can be used to determine how and/or where to split the next level zones. A rolling hash function can be used on the content of the data region 402, whereby a number of bits of the rolling hash results can be masked based on a desired zone size. An example of such rolling hash function includes the Karp-Rabin rolling hash function for shifting a substring search (as discussed in http://en.wikipedia.org/wiki/Rabin-Karp_string_search_algorithm). By way of a non-limiting example, if it were desirable to split the data stream into three zone levels with approximate zone sizes of 8 MB, 2 MB and 512 KB, a mask of 23 low-end binary zeros ($2^{23}$=8 MB), 21 low-end binary zeros ($2^{21}$=2 MB) and 19 low-end binary zeros ($2^{19}$=512 KB) on the rolling hash can create split points for these respective zone sizes. In this example, level-3 zones 412 can be approximately 512 KB in size, level-2 zones 408 can be approximately 2 MB in size, and level-1 zones 404 can be approximately 8 MB in size.

As stated above, for each zone 404, 408, and 412, a zone stamp can be created by the core of the server 204 that is responsible for processing it. An exemplary stamp creation process is detailed co-owned U.S. Pat. No. 8,412,848 to Therrien et al., issued Apr. 2, 2013, which is incorporated herein by reference in its entirety. In some implementations, a zone stamp can include from 3 to 64 characters that can be used to determine whether or not zones are similar, identical, and/or substantially similar. The zone stamps can have same and/or different ranges of bytes regardless of zone levels. The zone stamp characters can be generated at a predetermined frequency based on a particular size of a zone. For example, for a level-3 zone stamp for a 512 KB zone, the server core can generate a stamp character four times as often as a 2 MB level-2 zone. For a level-2 zone stamp for a 2 MB zone, the server core can generate a stamp character four times as often as 8 MB level-1 zone.

In some implementations, in a single processing pass over bytes of data within the data region 402, all desired levels of zones can be created simultaneously as well as their associated stamps (alternatively, the zone levels can be created subsequently, and/or based on a predetermined pattern, and/or in any other fashion). Processing of the data region 402 (e.g., splitting into individual zones within each level) can generate stamp tables 406, 410, 414. Each stamp table contains zone stamps identifying zones within corresponding zone levels. Thus, stamp table 406 can contain zone stamps identifying zones within level-1; stamp table 410 can contain zone stamps identifying zones within level-2; and stamp table 414 can contain zone stamps identifying zones within level-3. Each entry in the stamp tables 406, 410, 414 can further include a backup region identifier, a starting offset and an actual size of each zone, and a zone stamp for that zone.

FIG. 4b illustrates an exemplary entry in a stamp table 450, according to some implementations of the current subject matter. The stamp table 450 can include at least one of the following data: a zone level, a back region identifier, an offset, a size, and zone stamp. For example, for zone level "1", the backup region ID can be "1234567", an offset (e.g., starting location of a zone) can be "8000000", its size can be "10000000" and its zone stamp can be "EEEKLCB."

In some implementations, a higher level N stamp table can include fewer entries than the lower level N+1 stamp table (wherein N is an integer), thereby minimizing the number of entries in each level of stamp tables.

II. Stamp Matching and Stamp Table Maintenance

In some implementations, after zones are split into multiple zones and zone stamp tables are created, the current subject matter can perform comparison of zone stamps to determine zones that are candidates for deduplication. An exemplary process of zone stamp comparison is disclosed in co-owned U.S. Pat. No. 8,412,848 to Therrien et al., issued Apr. 2, 2013, which is incorporated herein by reference in its entirety. The zone stamps can be compared to other zone stamps within zone stamp table for that zone level (e.g., level-1). For example, zone stamps of level-1 zones in one data region within a data stream can be compared to zone stamps of level-1 zones in another data region within the same and/or different data streams. The zones, which zone stamps are being compared, can have similar sizes.

In some implementations, in view of the multiple zone levels, zone stamps created for one level of zones may have no logical relation with zone stamps created for another level of zones. Thus, an independent stamp matching process can be used for each zone level where zones stamps of zones that are at the same zone level are matched against other zone stamps at that level. For example, if there were two expected zone levels (e.g. 8 MB and 512 KB), there would be two independent stamp tables (e.g., table 406 and 410, respectively) that can be maintained, one for each zone size.

Figure 5:
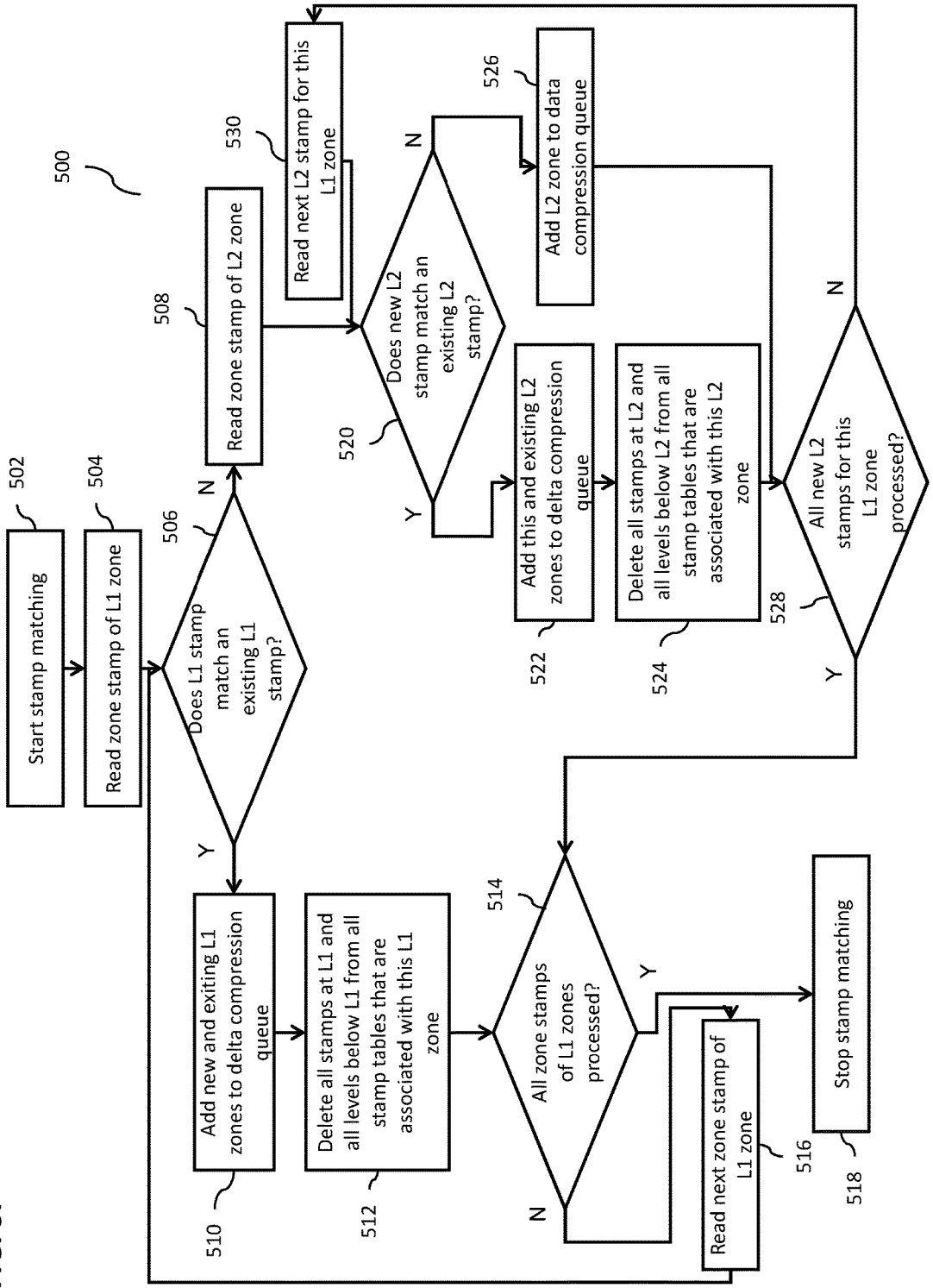
FIG. 5 illustrates an exemplary zone stamp comparison and/or matching process, according to some implementations of the current subject matter.

FIG. 5 illustrates an exemplary zone stamp comparison and/or matching process 500, according to some implementations of the current subject matter. While FIG. 5 is illustrated for only two zone levels, it is understood that the process 500 can be performed for any number of zone levels. In some implementations, the process 500 can perform processing of as many zones at a higher level N before proceeding to processing of zones at a lower level N+1. This can allow servers 204 (shown in FIG. 2) to avoid performing stamp matching operations at level-N+1 or greater for any zones at level-N whose stamp matches an existing zone at the same level. Further, for any zone at level-N, whose stamp matches an existing zone at the same level, servers 204 can perform a single downstream delta compression operation as compared with potentially multiple individual delta compression operations at level N+1 or greater levels. Also, for any zone at level-N, whose stamp matches an existing zone at the same level, servers 204 can purge stamp metadata within the stamp table(s) at levels N+1 and/or greater, thereby reducing the overall size of each zone level's stamp table. Alternatively, the process 500 can be performed in parallel at some and/or all zone levels without awaiting completion of processing at a particular level.

As shown in FIG. 5 (showing the process 500 being performed for level-1 zones first), at 502, the zone stamp comparison/matching process can be initiated. At 504, a zone stamp for a level-1 zone can be identified and/or read. The zone stamp can be obtained from a stamp table 406 (shown in FIG. 4a). At 506, a determination can be made whether a zone stamp for a level-1 zone matches another existing zone stamp for a level-1 zone. This determination can be made based on a comparison of zone stamps in the level-1 table 406 (shown in FIG. 4*a*). The table 406 can store zone stamps for level-1 zones from the data region to which the level-1 zone belongs, a current data stream, and/or from any other data stream and/or data region within any data stream.

If a match between two zone stamps is found, the matching level-1 zones can be added to a delta compression queue, at 510. Additionally, all zone stamps for level-1 zones and/or all zone levels below level-1 can be deleted/purged from stamp tables that are associated with these zones, at 512. Because the level-1 zone matched an existing zone, and the zone is going to be delta compressed, its level-1 zone stamp metadata can be deleted/purged from the level-1 stamp table (e.g., table 406). Further, if there exist additional lower level zones below level-1, all metadata related to those zones within this level-1 zone can be deleted, at 512.

At 514, the process 500 can determine whether all zone stamps for level-1 zones have been identified and/or read for a particular data stream. If that is the case, the zone stamp matching process can be terminated, at 518. Otherwise, next zone stamp for a level-1 zone can be identified and/or read, at 516, and the processing can return to 506.

If no match is found, the processing can proceed to 508, where a zone stamp for a level-2 zone can be identified and/or read. Similar to 506, this zone stamp is compared to an existing zone stamp of a level-2 zone to determine whether there is a match between two zone stamps, at 520. The existing zone stamp for a level-2 zone can be obtained from table 410 (shown in FIG. 4*a*). The table 410 can store zone stamps for level-2 zones from the level-1 zone(s) to which the level-2 zone belongs and/or any other level-1 zone, a current data stream, and/or from any other data stream and/or data region within any data stream.

If a match between two zone stamps is found, the matching level-2 zones can be added to a delta compression queue, at 522. Additionally, all zone stamps for level-2 zones and/or all zone levels below level-2 can be deleted/purged from stamp tables that are associated with these zones, at 524. Similarly, in view of the level-1 zone being matched an existing zone and being delta-compressed, its level-2 zone stamp metadata can be deleted/purged from the level-2 stamp table (e.g., table 410). Also, metadata related to lower level zones below level-2 for that zone, if any, can be deleted as well, at 524.

At 528, the process 500 can determine whether all zone stamps for level-2 zones have been identified and/or read for a particular level-1 zone (and/or other level-1 zone(s), and/or data region(s), and/or data stream(s)). If that is the case, the zone stamp matching process 500 can return to 514 to determine whether other zone stamps of level-1 zones exist for processing. Otherwise, next zone stamp for a level-2 zone can be identified and/or read, at 530, and the processing can return to 520.

If no match between the zone stamp of the level-2 zone and an existing zone stamp of the level-2 zone is found, the level-2 zone can be added to a data compression queue. An example of a data compression process can include lossless data compression algorithms Lempel-Ziv, gzip, etc. The processing can then return to 528 and 514 to account for all zones. Alternatively, the processing can be repeated for level-3 and/or other lower level zones, where splitting of zones and/or stamp matching can be performed to any desired level of granularity.

III. Delta Compression, Level-Specific Zone Storage and Replication

In some implementations, once the zones are identified for delta-compression and/or data compression, the current subject matter can generate queue(s) for each zone level. In some implementations, a single queue can be generated that can include zones identified for delta-compression and/or data compression. For all matching zone stamps of zones at level-1, level-1 zone can be delta compressed against an existing level-1 zone, and the resulting delta patch file can replace the level-1 zone. The delta patch file can be logically associated to the matching existing zone using zone metadata that can indicate a dependent relation for the delta zone and the existing zone.

For zone stamps that do not have zones that matched at any level, the current subject matter can aggregate data-compressed forms of the lowest level zones as a level-1 container of smaller data-compressed zones. In some implementations, contents of a container can include one or more data compressed and/or delta compressed zones. The container can be an efficient way to store and/or retrieve data from a magnetic hard disk drive, and/or any other type of storage, and/or memory location. All of the lower level zone stamps can be preserved in the even that a match occurs with zones created in the future.

Figure 6A:
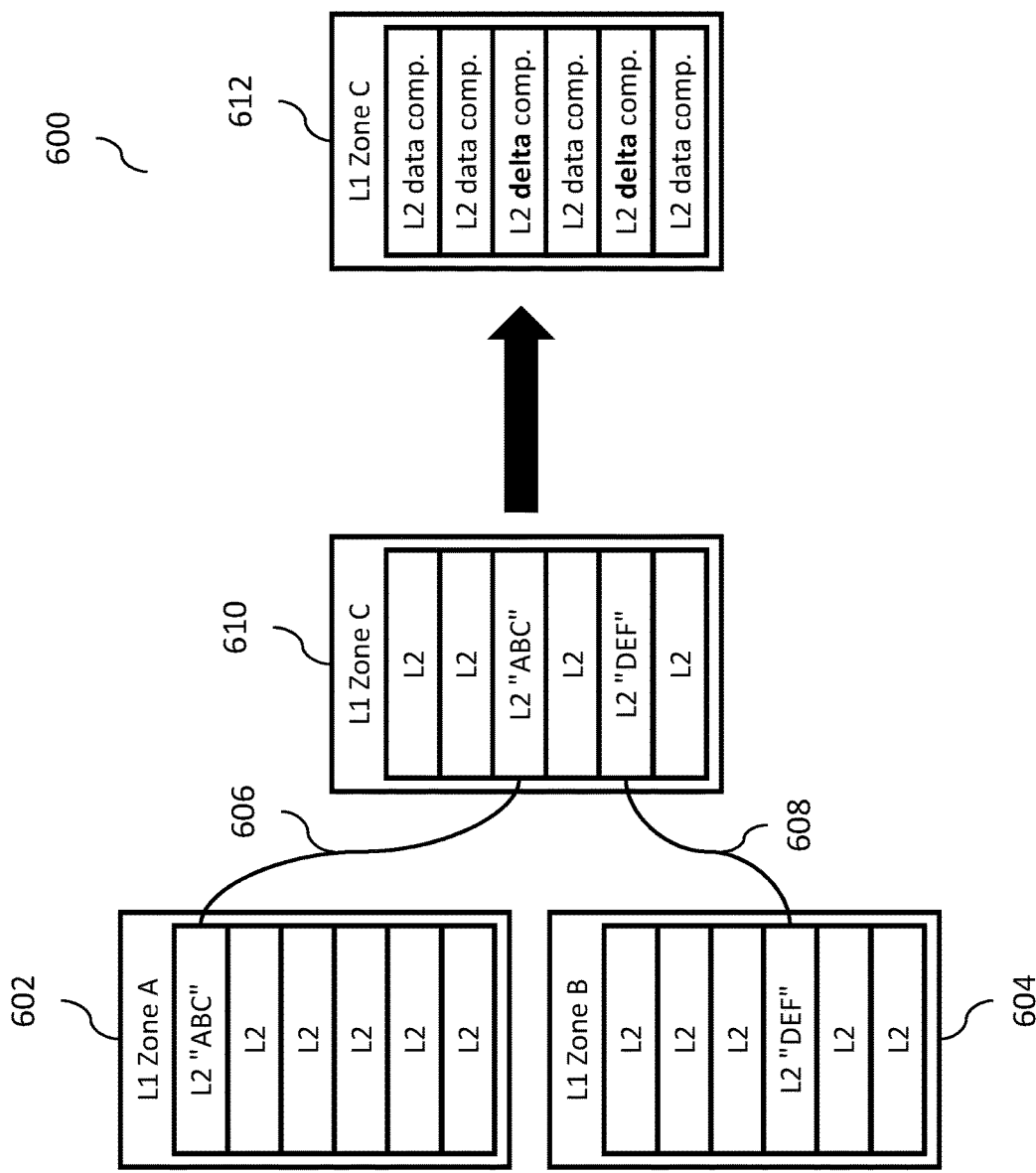
FIG. 6a illustrates an exemplary delta-compression and/or data-compression processes for various zones, according to some implementations of the current subject matter.

For zone stamps that did not match at level-1, but one or more matches were found at level-2, a new zone can be processed by either delta-compressing that zone against a matching level-2 zone, and/or data-compressing that zone (e.g., by using a known lossless compression algorithm). FIG. 6*a* illustrates an exemplary delta-compression and/or data-compression processes 600 for various zones, according to some implementations of the current subject matter. As shown in FIG. 6*a*, level-1 zone A 602 can include a plurality of level-2 zones "L2". Similarly, level-1 zone B 604 can include a plurality of level-2 zones "L2". A new level-1 zone C 610 has been identified and/or read (as in the process 500 shown in FIG. 5).

The new level-1 zone C 610 does not match any other level-1 zones A, B during the stamp matching process, thus, the stamp matching proceeds to identify/read zones at level-2 to determine whether their zone stamps match. As shown in FIG. 6*a* example, one level-2 zone ("L2 ABC") contained within level-1 zone A 602 matches one level-2 zone ("L2 ABC") in level 1 zone C 610 (as indicated by 606); similarly, one level-2 zone ("L2 DEF") contained within level-1 zone B 604 matches one level-2 zone ("L2 DEF") in level-1 zone C 610 (as indicated by 608). Here, the entire new level-1 zone C 610 can be processed by delta-compressing the two level-2 zones that matched two existing level-2 zones from zones A and B, and the four other level-2 zones of the new level-1 zone can be data compressed to produce a data compressed and/or delta compressed file, as shown by 612.

The level-1 zone can become an efficient "container" for level-2 and lower level zones. In this case, disk input/output operations can be much more efficient when larger files are requested to be read and written than when smaller individual files are accessed. It may also be advantageous to support containers that contain multiple level-1 zones to further improve disk input/output operations efficiency on read/write operations.

Level-1 containers can contain one or more level-2 zones, and thus, it may be important to be able to quickly access level-2 zones without having to serially scan the level-1 zone. Container metadata related to level-2 zones can be managed using fixed length records of M bytes per level-2 zone in order to more quickly locate sub-container metadata records with a very fast binary search model.

In some implementations, the current subject matter can also perform repacking and/or purging of various data. For example, over time, applications 109 (shown in FIG. 1) can determine that certain data that has been sent to the deduplication grid 102 can be deleted. This determination can be made based on various factors, including, but not limited to, retention policies that can be defined by application's administrator. When an application sends delete data requests to the deduplication grid 102, each grid server 204 (shown in FIG. 2) can determine which level-1, level-2, etc. zones can be deleted. The current subject matter can perform repacking and/or deletion of data at any level and/or any combination of levels.

To illustrate repacking and/or deletion of data, in some exemplary implementations, the following operations can be performed in a system that can include level-1 and level-2 zones that can be delta-compressed and/or data-compressed. These operations can be performed any system having any number of levels of zones. In this system, any level-2 zone that has been delta-compressed and has no other dependencies on it, can be marked for deletion. Further, any level-2 zone that is an anchor (e.g., a delta-compressed version of data having other delta-compressed versions of data dependent on it, but that might not depend on any other delta-compressed version of data) for other level-2 delta-compressed versions of data can be marked for deletion. However, such anchor can only be deleted when all of its associated dependent delta-compressed versions have already been deleted. Additionally, any level-1 zone that has all of its level-2 zones marked for deletion, where the level-2 zones are delta-compressed zones, and/or anchor zones with no delta-compressed dependent versions, can be marked for deletion. In any other situation, level-1 and/or level-2 zone can be persistent.

When one or more level-2 zones within a level-1 zone, but not all of the level-2 zones within a level-1 zone are marked for deletion, the deletion operation can be performed by repacking the level-1 zone to exclude those level-2 zones that are able to be deleted. Alternatively, all of the surviving level-2 zones across multiple level-1 zones can be coalesced into a new container that retains a collection of surviving level-2 zones and does not represent a collection of associated level-1 zones.

Figure 6B:
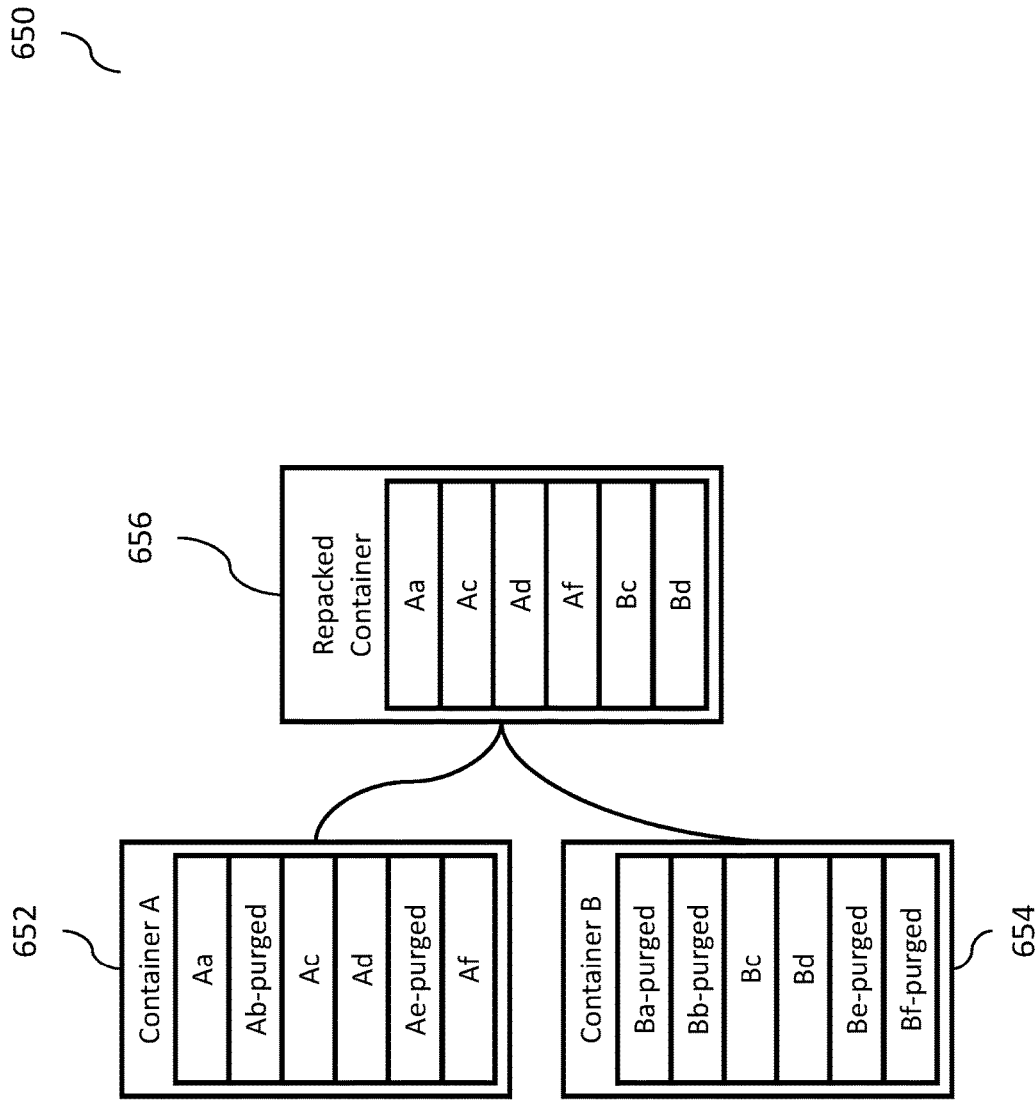
FIG. 6b illustrates exemplary repacking of the zones, according to some implementations of the current subject matter.

FIG. 6b illustrates exemplary repacking of the zones 650, according to some implementations of the current subject matter. As shown in FIG. 6b, container A 652 and container B 654 include a plurality of zones, some of which are purged zones marked for deletion (e.g., in container A 652, these are "Ab-purged" and "Ae-purged"; in container B 654, these are "Ba-purged", "Bb-purged", "Be-purged", and "Bf-purged"). Containers A and B can repacked and/or combined into a single container 656 based on the non-purged zones. Container A and container B can be deleted after the new repacked container 656 is created. The new container 656 can include zones Aa, Ac, Ad, Af, Bc, and Bd. The zones purged from containers A and B are not included in container 656.

Figure 7:
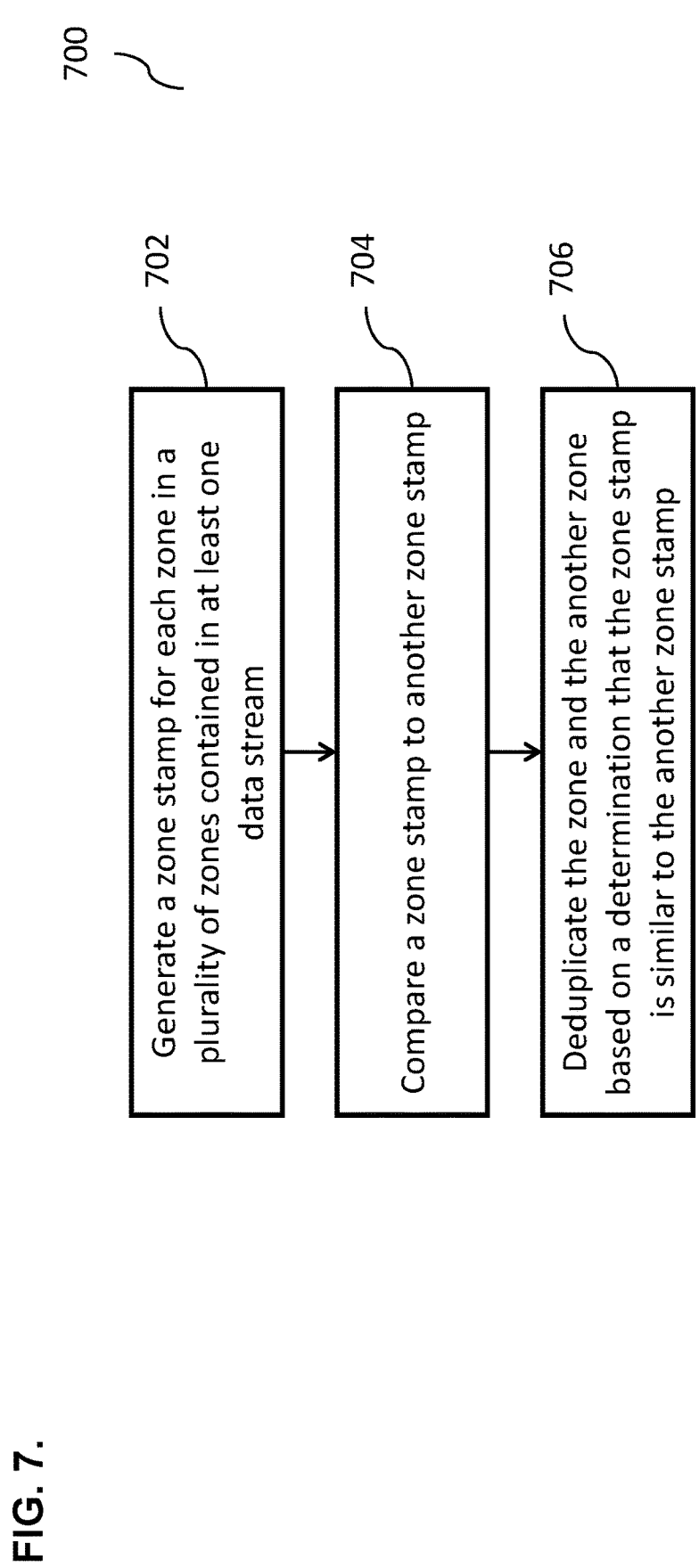
FIG. 7 illustrates an exemplary method, according to some implementations of the current subject matter

FIG. 7 illustrates an exemplary method 700 for performing multi-level deduplication, according to some implementations of the current subject matter. At 702, a zone stamp for each zone in a plurality of zones contained in at least one data stream can be generated. The stream of data can be a backup stream. At 704, a zone stamp can be compared to another zone stamp. The zone stamp can represent a zone in the plurality of zones. Another zone stamp can represent another zone in the plurality of zones. The comparison can be performed for zones at corresponding zone levels based on a determination that a zone stamp of a zone of a preceding zone level is not similar to another zone stamp of another preceding zone level. The zone at the preceding zone level can include at least one zone of a next zone level having a size smaller than or equal to a size of the zone of the preceding zone level.

At 706, the zones can be deduplicated based on a determination that the zone stamp is similar to another zone stamp.

In some implementations, the current subject matter can include one or more of the following optional features. Upon determination that a zone stamp of a preceding level zone is not similar to another zone stamp of another preceding level zone, each zone stamp of a next level zone can be compared another zone stamp of another next level zone. Both next level zones can be contained within the same preceding level zone.

In some implementations, upon determination that a zone stamp of a preceding level zone is not similar to another zone stamp of another preceding level zone, each zone stamp of a next level zone can be compared another zone stamp of another next level zone. The next level zone and another next level zone can be contained in different preceding level zones.

In some implementations, deduplication can include delta-compressing the zone, and transmitting the delta-compressed zone across a network from a storage location to another storage location.

In some implementations, the method can further include at least one of the following operations that can be performed upon determination that a zone stamp of a preceding level zone is not similar to any zone stamp of any other preceding level zone. The preceding level zone can be data-compressed and transmitted across a network from a storage location to another storage location.

In some implementations, generation of a zone stamp can include processing the data stream to determine all zone levels contained within the data stream. All zone levels for the data stream can be determined simultaneously. For each zone, a zone entry can be stored in a table. The zone entry can include a starting location and a size of the zone, a zone stamp identifying the zone based on the starting location and the size of the zone, an identifier identifying location of the zone of the at least one data stream, and a data stream identifier (which can identify a particular data stream). Upon determination that a first zone stamp of a first zone is similar to a second zone stamp of a second zone, the first zone can be delta-compressed, stored, and then a first zone entry can be removed from a table corresponding to the first zone. Further, upon determination that a first zone stamp of a first zone is not similar to a zone stamp of any other zone, the first zone can be data-compressed and stored, and then the first zone entry can be removed from the table corresponding to the first zone.

In some implementations, generation of a zone stamp can include generating a container corresponding to each preceding level zone, wherein the container includes all next level zones, each next level zone being smaller than or equal to the preceding level zone, and searching, using a metadata associated with each zone in the container, for zones having similar zone stamps, wherein for each zone level, the metadata can have a predetermined fixed size.

In some implementations, the method can further include marking a preceding level zone for deletion, determining whether all next level zones contained within the preceding level zone have been deleted, deleting the preceding level zone upon determination that all next level zones contained within the preceding level zone have been deleted, and persisting the preceding level zone upon determination that at least one next level zone in the all next level zones contained within the preceding level zone have not been marked for deletion.

In some implementations, each zone has a fixed length and/or a variable length.

IV. Next-Level Deduplication

In some implementations, the current subject matter can perform multi-level deduplication, whereby zones in one or more data streams that have not been matched (e.g., failed to be matched) with other zone at the same level (e.g., level-1) can be allowed to be further processed for matching at the next level (e.g., level-2). This process can be achieved by attaching various additional content-based metadata to a zone (which has not been matched) to generate candidate pairs of zones that can be delta compressed together.

Similar to the discussion above, level-1 deduplication process can split the incoming data stream (e.g., backup data stream) into level-1 zones of a particular size (e.g., approximately 8 Mbytes in size). Each level-1 zone can have a variable length. At level-1, one or more level-1 zones can be matched with other level-1 zones. The matching can be performed based on a similarity and/or identity of content. Once similar/identical content is determined to be present in the level-1 zones, the zones can be delta-compressed together. This can reduce local and/or remote storage capacity as well as bandwidth of a link connecting (e.g., wirelessly, wired, etc.) one or more sites between which transmission of delta-compressed zones can occur. The process of matching level-1 zones can continue until all possible level-1 zones are matched together. Upon completion of the level-1 matching process, one or more level-1 zones that have not be been matched to other level-1 zones can remain. These remaining level-1 zones can be subject to the next-level deduplication process, as discussed herein. The next-level deduplication process can continue as long as desired and/or be stopped at a specific level (e.g., meeting certain zone size requirements).

In some implementations, the level-1 unmatched zones can be further processed to generate further zone stamps (i.e., level-2 zone stamps) that can be used to determine similarities that were missed at level-1. The level-2 zone stamps can be compared to other level-2 zone stamps to determine similarities. Comparison of level-2 zone stamps can be used to identify one or more zones that were may have been previously determined not to be similar/identical at level-1. These zones can be in fact similar/identical to each other. The zones can be level-1 zones and/or level-2 zones (e.g., zones within level-1 zones). When two zones are determined to be similar using the level-2 zone stamps, the zones can be delta-compressed. Upon completion of the level-2 matching process, one or more level-2 zones that have not been matched to other level-2 zones can remain. These remaining level-2 zones can be subject to the next-level (e.g., level-3) deduplication process.

As described above, the current subject matter's deduplication process can include parallel backup stream splitting, stamp generating or creation, stamp matching, delta-compression, storage, and replication operations at each level.

A. Next-Level Parallel Backup Stream Splitting and Stamp Creation

Figure 8:
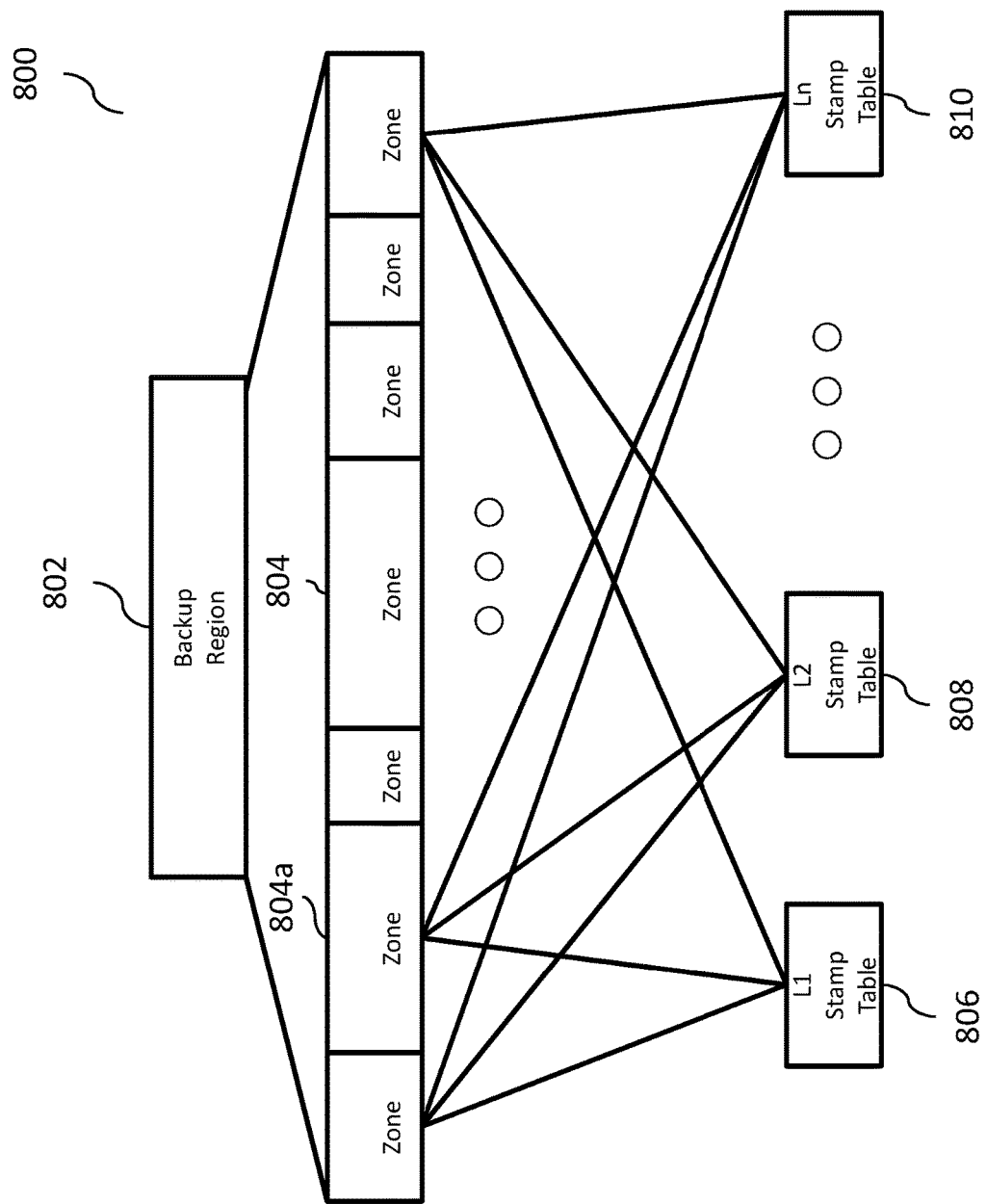
FIG. 8 illustrates an exemplary data region within an incoming data stream, where the data region includes a plurality of zones, each zone being associated with one or more stamp tables, according to some implementations of the current subject matter

As discussed above in connection with FIG. 3, an incoming backup stream (or any data stream) can be processed using system 300 that includes one or more grid servers (as shown in FIG. 2) that can contain one or more multi-core central processing units. The incoming backup stream can be subdivided into backup regions 802, as shown in FIG. 8, each of which can generate one or more level-1 zones 804. As stated above, subdivision of the stream into backup regions can allow grid server(s) to process each backup region 802 using multiple concurrent threads (e.g., threads 304 as shown in FIG. 3) independently and/or in parallel. During processing, level-1 zones can be split into smaller level-2 zones, where level-2 zones can also be split into smaller level-3 zones, and so forth (as shown in FIG. 4a). Determination of zone sizes and/or splitting of the stream into zones can be performed using the process discussed above (as shown in FIG. 4a).

In some implementations, the current subject matter can perform management (e.g., create, modify, store, delete, purge, etc.) of different level zones. For example, zones that may have been determined to be similar (and/or substantially similar, identical, substantially identical, etc.) at level-1 can be further processed and delta-compressed. However, some level-1 zones, even though being similar, might not be detected to be similar. The current subject matter can implement a similarity detection technique described below to determine similarity of these zones.

FIG. 8 illustrates the backup region 802 that has been split into one or more sequential, non-overlapping zones 804. Each of the zones 804 can have one or more zone stamps created that can be associated with the zone. An exemplary zone stamp creation process is disclosed in co-owned U.S. Pat. No. 8,412,848 to Therrien et al., issued Apr. 2, 2013, which is incorporated herein by reference in its entirety. For example, a level-1 zone stamp can include 3-64 characters.

In some implementations, the current subject matter can process the backup region 802 (shown in FIG. 8) and generate zones 804 as well as zone stamps for each level along with corresponding stamp tables. For example, upon processing of zone 804a, level-1 zone stamps, level-2 zone stamps, . . . level-n zone stamps can be generated. Level-1 zone stamps can be contained within a level-1 zone stamp table 806; level-2 zone stamps can be contained within a level-2 zone stamp table 808; . . . level-n zone stamps can be contained within a level-n stamp table 810. The zone stamps and/or zone stamp tables can be stored in one or more memory locations (which can include physical memory location and/or virtual memory locations, and/or any combination thereof). The zone stamps (for two or more levels) can be generated simultaneously. Each entry in the zone stamp tables 806-810 can include a backup region ID, a starting offset and an actual size of each zone, and appropriate level zone stamps. In some implementations, the zone stamp tables for one level (e.g., level-2) can include zone stamps for one or more preceding or higher levels (e.g., level-1) and/or can include zone stamps for one or more subsequent or lower levels (e.g., level-3). As can be understood, any number of zones and/or zone stamps and/or zone stamp tables can be processed and/or generated, and the current subject matter is not limited to the number of zone, zone stamps, and/or zone stamp tables shown and/or discussed herein.

As stated above, the zone stamps for the multiple levels can be generated simultaneously. In particular, level-1 stamp generation and matching process can be performed as described in co-owned U.S. Pat. No. 8,412,848 to Therrien et al., issued Apr. 2, 2013, which is incorporated herein by reference in its entirety. Next-level zone stamp generation and matching process can be performed in accordance with the following. For ease of description only, the following will refer to generation and matching of level-1 zone stamps and level-2 zone stamps. As can be understood, zone stamps for any number of levels can be generated and matched.

During level-1 stamp generation and matching process, level-1 zones and level-2 zones can be generated (e.g., simultaneously and/or one after the other). In some implementations, next-level (e.g., level-2) zone stamps can be generated when a determination is made that generation of such next-level (e.g., level-2) zones may be necessary (e.g., when a match for at least one preceding level (e.g., level-1) zone cannot be ascertained during the preceding zone (e.g., level-1) stamp generation and matching process). Alternatively, next-level (e.g., level-2) zone stamps can be generated regardless of such determination.

As stated above, level-1 stamps can be text strings having 3-64 characters in length. These level-1 stamps can be compared to one another to determine an edit distance between representative zone stamp pairs. An edit distance can be a way to quantify how dissimilar two strings are to one another by counting a minimum number of operations that may be required to transform one string into the other.

Figure 9:
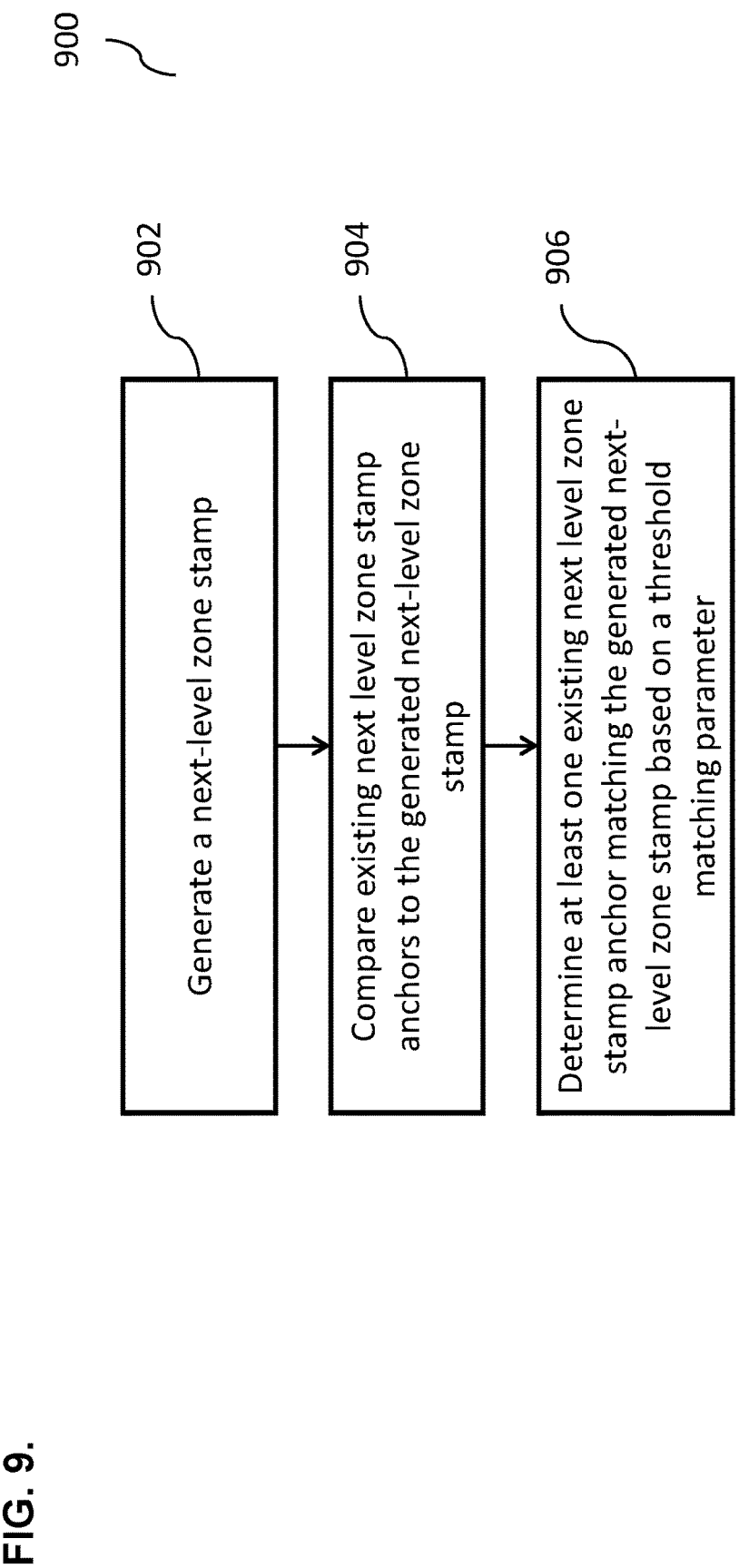
FIG. 9 illustrates an exemplary process for generating and matching of next-level zone stamps, according to some implementations of the current subject matter

In some implementations, upon completion of the level-1 zone stamp determination, the current subject matter can proceed to determine and/or generate next level (e.g., level-2) zone stamps. FIG. 9 illustrates an exemplary process for generating and matching of next-level zone stamps, according to some implementations of the current subject matter. At 902, a next-level zone stamp for each zone in a data stream can be generated. The next-level zone stamps can be generated using one or more hashing algorithms. For example, zone stamps can be generated and represented as 32-bit cyclic redundancy check ("CRC-32") checksums or hashes. CRC-32 checksums can be quickly computed and can provide an improved downstream zone stamp matching and delta compression. For example, assuming a zone size of approximately 8 MB, a new next-level (e.g., level-2) CRC-32 checksum can be generated for each approximately 8 KB sequential segment of this zone. This can produce approximately 1000 CRC-32 checksums. In some implementations, once a set of hashes (i.e., zone stamps) is generated, a subset of the set of hashes can be selected for the purposes of zone stamp matching. In some implementations, the smallest hashes can be selected. Alternatively, the largest hashes can be selected. The number of hashes contained in the subset of hashes can be selected for a particular backup system and can be independent of the size of the backup and/or zones being processed. Once the number of hashes and the type of hashes (e.g., smallest, largest) in the subset of hashes is selected, they can be consistently used for the purposes of generating zone stamps in that backup system. This can ensure predictability and effectiveness of data deduplication when the selected subset of hashes is used. To select a subset of hashes, various selection algorithms can be used and can include at least one of the following: min-wise hashing, super-fingerprinting, lowest common substring, lowest common subsequence, suffix trees and/or any other filtering/selection criteria, and/or any combination thereof. In the above example, a subset of generated CRC-32 checksums can be selected from the generated list of 1000 checksums for further processing (e.g., matching with existing zone stamps), where the subset of hashes can include 25 smallest hashes. As can be understood, the number of hashes and/or type of hashes (e.g., smallest, largest, etc.) is not limited to this example. In some implementations, the number of hashes in the subset of hashes and/or which hashes to select (e.g., smallest, largest, etc.) can be determined experimentally for each backup system.

At 904, existing next-level (e.g., level-2) zone stamp anchors can be compared to the newly generated next-level zone stamps. The existing next-level zone stamp anchors can be organized in clusters headed by a next-level zone stamp anchor. A next-level zone stamp anchor can be a delta-compressed version of data that has other delta-compressed versions of data dependent on it, but which might not depend on any other delta-compressed version of data. The existing next-level zone stamp anchor can be generated based on previous processing of data streams. Any newly generated next-level zone stamps can be added to the existing zone stamp anchor. The existing next-level anchors that can be selected for comparison and/or matching can include anchors having the highest number of next-level (e.g., level-2) zone stamps that match the highest number of zone stamps of the new zone. The matching can be ascertained based on a number of matching zone stamps. Alternatively, the matching can be ascertained based on an accumulated byte count associated with each matching zone stamp.

At 906, a match between a newly generated next-level zone stamp and an existing next-level zone stamp anchor can be determined based on a threshold. The threshold can be determined based on a number of matching zone stamps or alternatively, based on a number of representative bytes related to matching zone stamps between an anchor zone and a new zone to ensure efficient delta compression. In some implementations, the threshold can be statically and/or dynamically determined (increased or decreased) and/or manually set and/or be a combination of both. In some implementations, the threshold can be adjusted based on monitoring of compression ratio of zone pairs. If it is determined that the zones are not compressing well, the threshold can be reduced to increase a number of zone pairs for the purposes of delta-compression. Otherwise, the threshold can be increased. The threshold can be determined based on a particular content of the backup data. In some implementations, a sample or a test data from the backup data can be selected for the purposes of determining the threshold value.

One of the advantages of the current subject matter's next-level multi-level deduplication process is an ability to generate improved deduplication ratios over existing ~8 KB exact matching implementations. The current subject matter process performs delta compression of larger, similar zones, and uses delta compression to find matching regions between the zones that are much smaller in length (approximately 16 bytes) rather than ~8 KB. Hence, the current subject matter process can ascertain similarity in data at a much finer level than cannot be determined at ~8 KB granularity. Further, the next-level multi-level deduplication process can provide for an improved delta-compression ratio (e.g., less than 50:1).

B. Next-Level Stamp Matching

Figure 10:
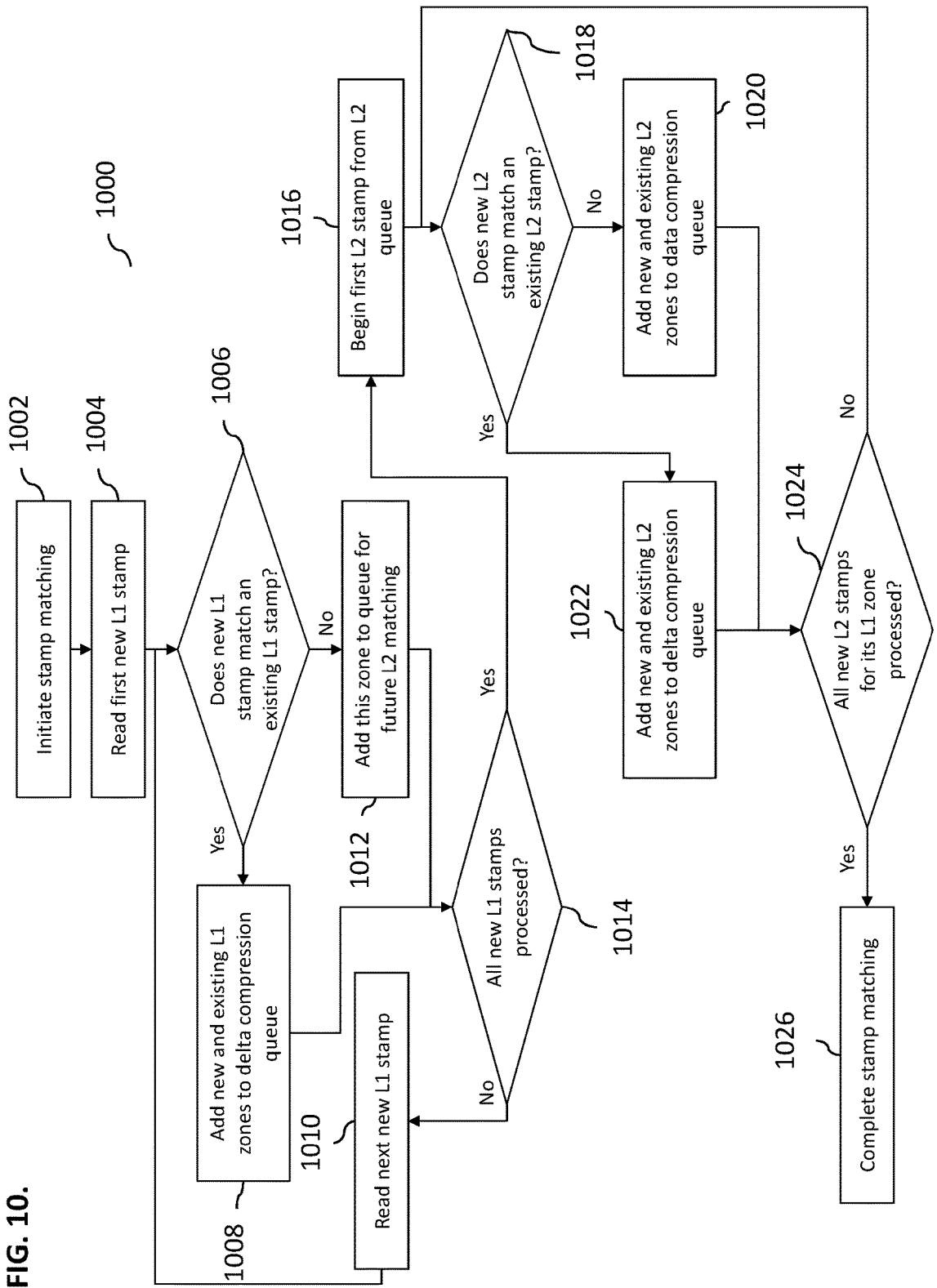
FIG. 10 illustrates an exemplary next-level multi-level deduplication process, according to some implementations of the current subject matter.

FIG. 10 illustrates an exemplary next-level multi-level deduplication process 1000, according to some implementations of the current subject matter. As shown in FIG. 10, the process 1000 is performed for level-1 and level-2 multi-level deduplication, however as can be understood the process can be performed any number of levels. It should be noted that there is an inherent efficiency in processing as many new zones at level N before proceeding to processing of zone at level N+1. For any new zone at level-N whose stamp matches an existing zone at the same level, there is no need to perform stamp matching operations at level N+1 or greater. Thus, if the zone stamp associated with one level (e.g., level-1) zone does not match any zone stamp of any other zone, zone stamp matching can proceed to the next level (e.g., level-2) perform comparison and matching of next level (e.g., level-2) zone stamps.

As shown in FIG. 10, at 1002, the zone stamp comparison/matching process can be initiated. As can be understood, the process 1000 can be initiated at any level. For ease of illustration, the following description will initiate the process 1000 at level-1. At 1004, a zone stamp for a level-1 zone ("new L1 stamp") can be identified and/or read. The zone stamp can be obtained from one or more stamp tables 806-810 (shown in FIG. 8). At 1006, a determination can be made whether a zone stamp for a level-1 zone matches another existing zone stamp for a level-1 zone. This determination can be made based on a comparison of zone stamps in the level-1 table 806 (shown in FIG. 8). The table 806 can store zone stamps for level-1 zones from the data region to which the level-1 zone belongs, a current data stream, and/or from any other data stream and/or data region within any data stream.

If a match between two zone stamps is found, the matching level-1 zones can be added to a delta compression queue, at 1008. At 1014, the process 1000 can determine whether all zone stamps for level-1 zones have been identified and/or read for a particular data stream. If that is the case, the zone stamp matching process 1000 can proceed to 1016, where level-2 zone stamps can be processed, as discussed below. Otherwise, next level-1 zone stamp can be identified and/or read, at 1010, and the process 1000 can return to 1006.

If no match is found at 1006, the process 1000 can proceed to 1012, where a zone stamp for a level-2 zone can be identified for the purposes of level-2 zone stamp matching. A queue of level-2 zone stamps can be generated for processing, at 1016

At 1016, a first level-2 zone stamp can be selected from the queue of level-2 zone stamps for comparison to existing zone stamps of level-2 zones to determine whether there is a match between the new level-2 zone stamp and existing level-2 zone stamps, at 1018. The existing zone stamps for level-2 zones can be obtained from table 808 (shown in FIG. 8). The table 808 can store zone stamps for level-2 zones from the level-1 zone(s) to which the level-2 zone belongs and/or any other level-1 zone, a current data stream, and/or from any other data stream and/or data region within any data stream.

If a match between the selected level-2 zone stamp and at least one existing level-2 zone stamp is found, the new level-2 zone and the existing level-2 zone can be added to a delta-compression queue, at 1022. If no match between the zone stamp of the new level-2 zone and at least one existing level-2 zone stamp is found, the level-2 zone can be added to a data compression queue, at 1020. An example of a data compression process can include lossless data compression algorithms Lempel-Ziv, gzip, etc. Alternatively, the unmatched level-2 zone can be added to a queue for next level (e.g., level-3) zone stamps matching and the process 1000 can be repeated with regard to the next level zone stamps.

The process 1000 can then proceed to a determination of whether all new level-2 zone stamps for a particular level-1 zone have been processed, at 1024. If that is the case, the process 1000 can terminate, at 1026. Otherwise, the process 1000 can return to 1018 to select and process the next level-2 zone stamp.

C. Next-Level Delta Compression and Data Compression

As discussed above, once the level-specific zone stamp matching processes are complete, queues corresponding zones can be generated for the purposes of performing delta compression and/or data compression. The delta compression and/or data compression can be performed at each specific level. For all zone stamp matches at level-1 to level-N, the corresponding new zone can be delta-compressed against an existing zone, and the resulting delta patch file can replace the new zone. The new delta patch file can be logically associated with the matching existing zone via zone metadata that shows a dependent relationship with the new delta zone on the existing zone.

For zone stamps that did not match zone stamps at any level, the associated zone can be data compressed. For these non-matching zones, the zone stamp data associated with level-1, level-2, . . . level-N can be stored (e.g., in a memory location, a database, etc.) to allow it to be compared to/matched with new zones that may be processed in the future.

D. Dynamically Adjusted Next-Level Time Delay

In some implementations, the current subject matter can perform level-based comparison and matching of zone stamps based on a specific schedule and/or based on a number of time each zone has been processed and/or its zone stamps have been compared to existing and/or new zone stamps. For example, the current subject matter system can delay next level processing (e.g., comparison, matching, etc.) of zone stamps until a predetermined period of time passes after processing of all prior level zone stamps. This can be helpful in view of the periodic nature of backup content. When one "cycle" of backup content is processed, it may be insufficient to obtain matching on all prior level zone stamps, and thus, one or more additional "cycles" of backup processes may be performed for matching purposes. If not matches are identified for prior level zones after such processing, next level zone stamps may be processed (e.g., compared, matched).

In some implementations, the current subject matter can monitor age or time at which level-1 zones acquire their first matching zone and are delta compressed. In particular, the current subject matter can perform monitoring of a percentage of matches in a back data over a predetermined period of time (i.e., "backup period"). During a first backup period, it is likely that there will be fewer matches among zones that will be determined and hence next-level (e.g., level-2) zone stamp generation/matching can be disabled. Once a second backup period begins, it is likely that there will be a significant amount of zone matches that will be produced (e.g., statistically, only approximately 2% of data changes from one backup period to the next backup period). In some implementations, the beginning of the second or next backup period can be determined by the significant increase (e.g., 90%) in the number of zone matches. Once the increase in the zone matching occurs, next-level (e.g., level-2) zone stamp matching can be initiated. In some implementations, for some known periodic backup data and/or applications, next-level zone stamp matching can be enabled at an initial backup period and/or can be enabled immediately after the initial backup period is completed.

Figure 11:
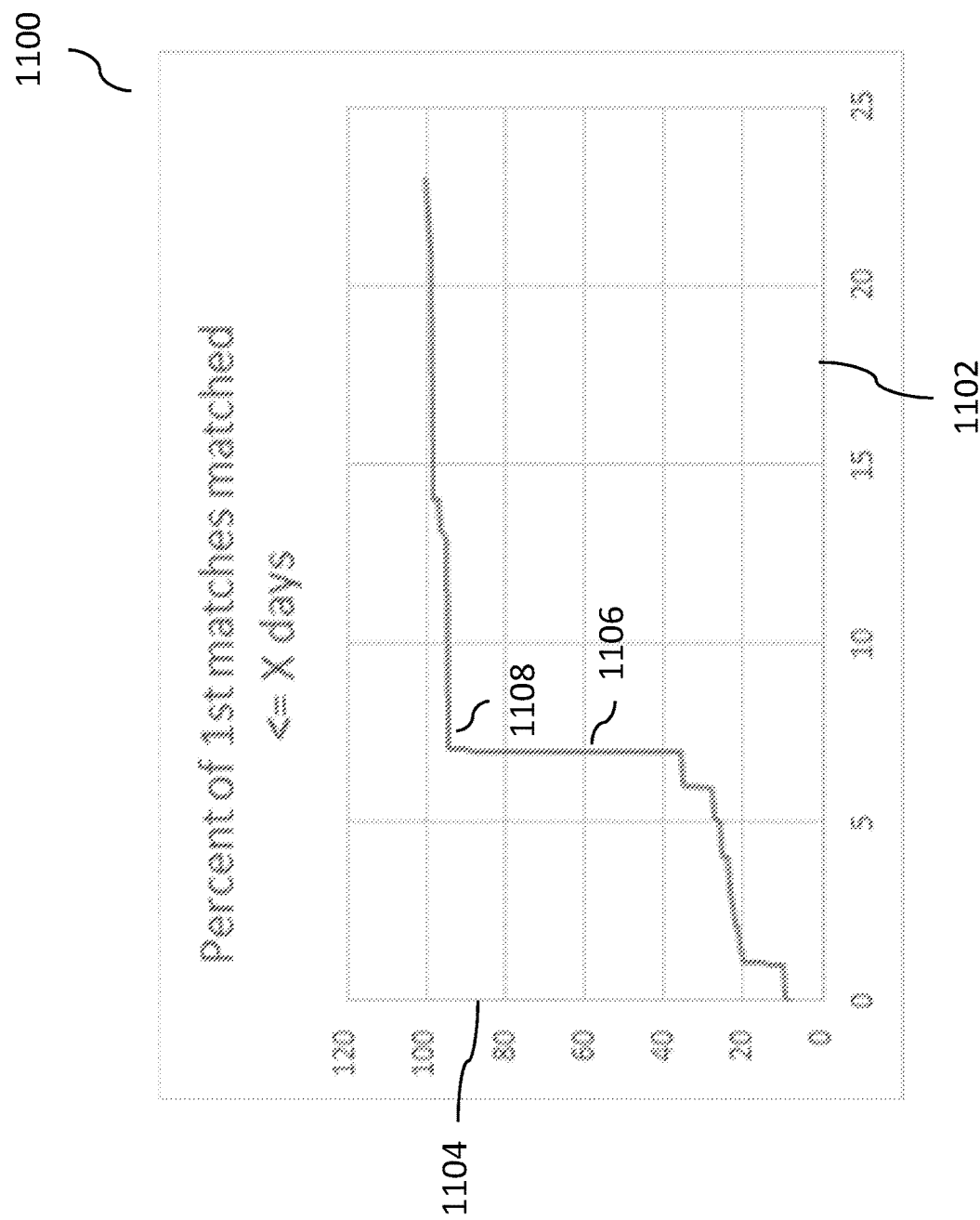
FIG. 11 illustrates an experimental plot showing a percentage of level-1 matches over a total number of zones processed at less than a particular number of days as a function of a number of days, according to some implementations of the current subject matter.

FIG. 11 illustrates an experimental plot 1100 showing a percentage of level-1 matches over a total number of zones processed at less than a predetermined period of time, i.e., a particular number of days (e.g., less than or equal to X) 1104 as a function of a number of days 1102, according to some implementations of the current subject matter. As shown in the plot 1100, it took approximately 7 days for data from successive weekly backup runs to allow many of the zones received on day 0 to be matched with day 7 zones (shown by the vertical line 1106). Here, next level (e.g., level-2) zone stamp matching can be executed starting at time 1108, which corresponds to the time when majority of zones have been matched at level-1. It should be noted that level-1 zone deduplication typically produces delta compression ratios in the range of 10:1 to 1000:1, whereas level-2 zone deduplication typically produces delta compression ratios in the range of 3:1 to 50:1.

Figure 12:
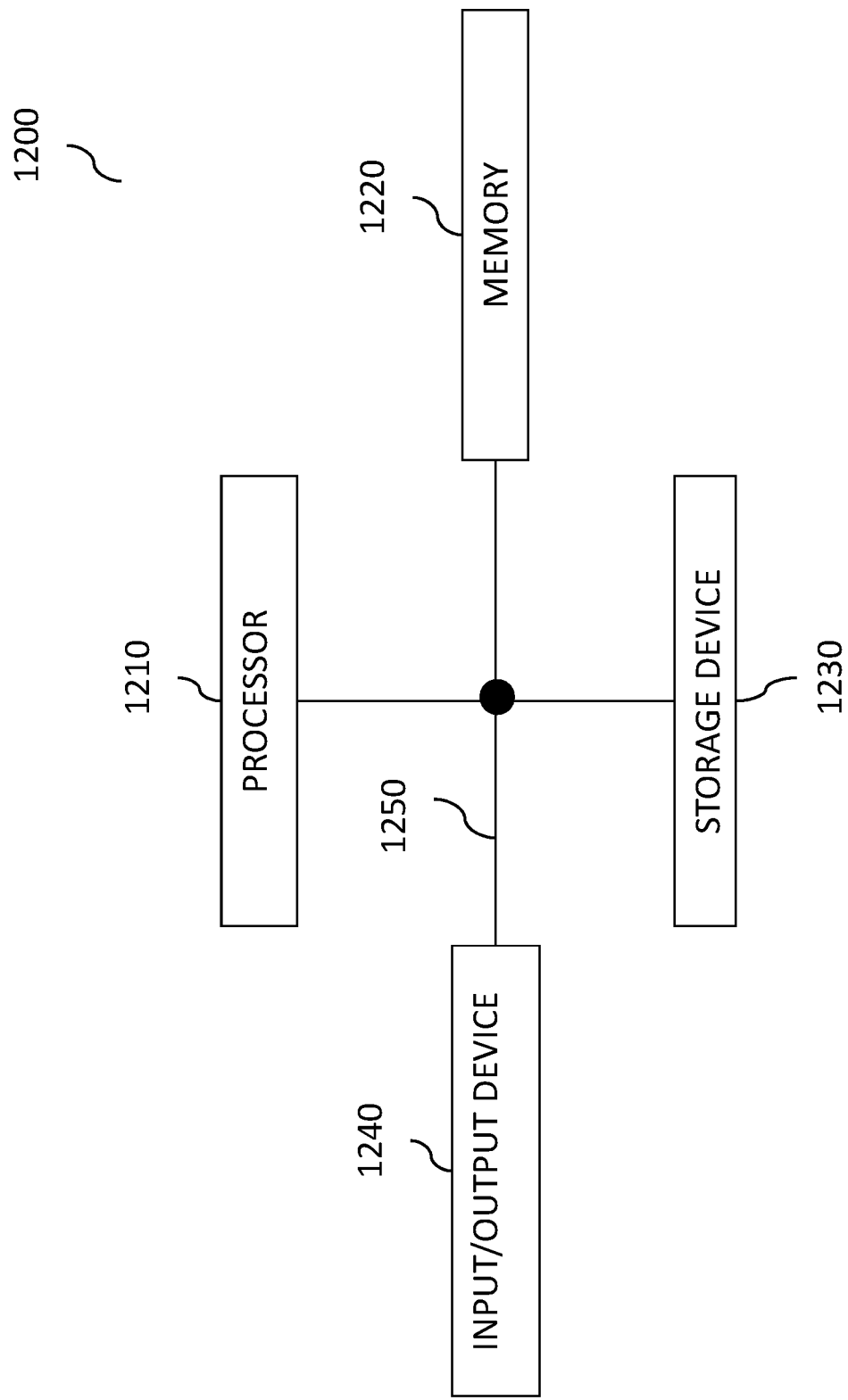
FIG. 12 illustrates an exemplary system, according to some implementations of the current subject matter.

In some implementations, the current subject matter can be configured to be implemented in a system 1200, as shown in FIG. 12. The system 1200 can include a processor 1210, a memory 1220, a storage device 1230, and an input/output device 1240. Each of the components 1210, 1220, 1230 and 1240 can be interconnected using a system bus 1250. The processor 1210 can be configured to process instructions for execution within the system 1200. In some implementations, the processor 1210 can be a single-threaded processor. In alternate implementations, the processor 1210 can be a multi-threaded processor. The processor 1210 can be further configured to process instructions stored in the memory 1220 or on the storage device 1230, including receiving or sending information through the input/output device 1240. The memory 1220 can store information within the system 1200. In some implementations, the memory 1220 can be a computer-readable medium. In alternate implementations, the memory 1220 can be a volatile memory unit. In yet some implementations, the memory 1220 can be a non-volatile memory unit. The storage device 1230 can be capable of providing mass storage for the system 1200. In some implementations, the storage device 1230 can be a computer-readable medium. In alternate implementations, the storage device 1230 can be a floppy disk device, a hard disk device, an optical disk device, a tape device, non-volatile solid state memory, or any other type of storage device. The input/output device 1240 can be configured to provide input/output operations for the system 1200. In some implementations, the input/output device 1240 can include a keyboard and/or pointing device. In alternate implementations, the input/output device 1240 can include a display unit for displaying graphical user interfaces.

Figure 13:
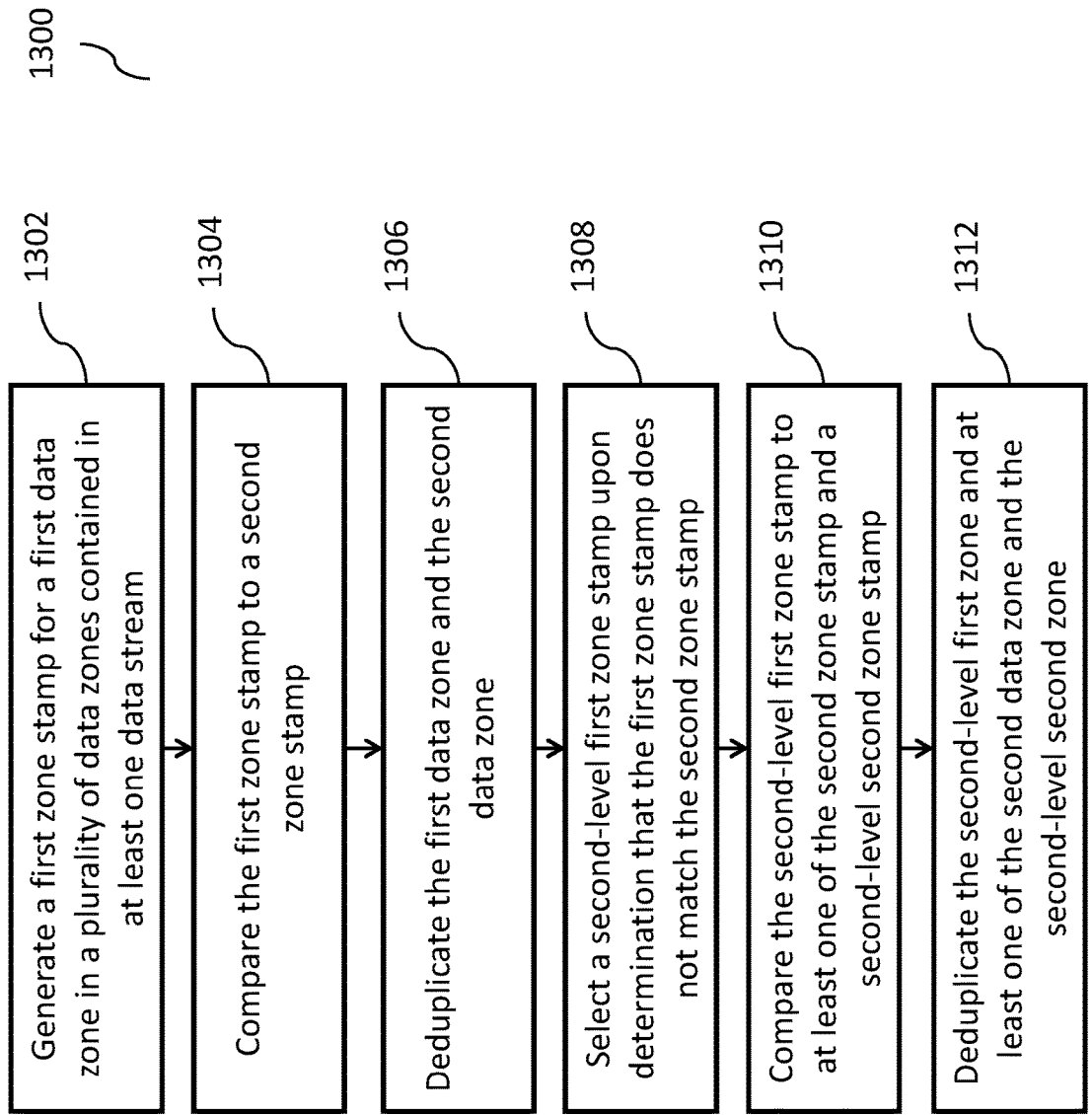
FIG. 13 illustrates an exemplary method, according to some implementations of the current subject matter.

FIG. 13 illustrates an exemplary next-level multi-level deduplication process 1300, according to some implementations of the current subject matter. At 1302, a first zone stamp for a first data zone in a plurality of data zones contained in at least one data stream can be generated. At 1304, the first zone stamp can be compared to a second zone stamp. The second zone stamp can represent a second data zone (which can be any data zone (whether or not in the same data stream)). The first and second data zones can be first level data zones. At 1306, the first data zone and the second data zone can be deduplicated upon determination that the first zone stamp matches the second zone stamp. At 1308, a second-level first zone stamp can be selected upon determination that the first zone stamp does not match the second zone stamp. The second-level first zone stamp can represent a second-level first data zone contained with the first data zone. At 1310, the second-level first zone stamp can be compared to at least one of the second zone stamp and a second-level second zone stamp. The second-level second zone stamp can represent any second-level second data zone (whether or not stored and/or within the same data stream). At 1312, the second-level first zone and at least one of the second data zone and the second-level second zone can be deduplicated based on a determination that the second-level first zone stamp matches at least one of the second zone stamp and the second-level second zone stamp.

In some implementations, the current subject matter can include one or more of the following optional features. The deduplication process can include delta-compressing a zone in the plurality of zones, and transmitting the delta-compressed zone across a network from a storage location to another storage location.

In some implementations, upon determination that a zone stamp of a zone does not match any other zone stamp, the process 1300 can further include data-compressing the zone, and transmitting the data-compressed zone across a network from a storage location to another storage location.

In some implementations, the generation of the zone stamp can include processing the data stream to determine all zone levels contained within the data stream. All zone levels for the data stream can be determined simultaneously. Further, for each zone, the process 1300 can store a zone entry in a table. The zone entry can include a starting location and a size of the zone, a zone stamp identifying the zone based on the starting location and the size of the zone, an identifier identifying location of the zone of the at least one data stream, and a data stream identifier.

In some implementations, upon determination that the first zone stamp matches the second zone stamp, the process 1300 can perform delta-compressing the first zone, and storing the delta-compressed first zone.

In some implementations, each zone can have a fixed length. Alternatively, each zone can have a variable length.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer implemented method, comprising:
    generating, using at least one deduplication grid server, a first zone stamp for a first data zone in a plurality of data zones contained in at least one backup data stream received by a deduplication server grid having a plurality of deduplication grid servers;
    comparing, using at least one deduplication grid server in the plurality of deduplication grid servers, the first zone stamp to a second zone stamp, wherein the second zone stamp represents a second data zone, wherein the first and second data zones are first level data zones, and deduplicating the first data zone and the second data zone upon determination that the first zone stamp matches the second zone stamp;
    selecting, using at least one deduplication grid server, a second-level first zone stamp upon determination that the first zone stamp does not match the second zone stamp, wherein the second-level first zone stamp represents a second-level first data zone contained within the first data zone; and
    comparing, using at least one deduplication grid server, the second-level first zone stamp to at least one of the second zone stamp and a second-level second zone stamp, wherein the second-level second zone stamp represents a second-level second data zone, and deduplicating the second-level first zone and at least one of the second data zone and the second-level second zone based on a determination that the second-level first zone stamp matches at least one of the second zone stamp and the second-level second zone stamp.

2. The method according to claim 1, wherein the deduplicating further comprises
    delta-compressing a zone in the plurality of zones; and
    transmitting the delta-compressed zone across a network from a storage location to another storage location.

3. The method according to claim 1, wherein upon determination that a zone stamp of a zone does not match any other zone stamp, further comprising
    data-compressing the zone; and
    transmitting the data-compressed zone across a network from a storage location to another storage location.

4. The method according to claim 1, wherein the generating further comprises processing the at least one data stream to determine all zone levels contained within the at least one data stream;
wherein all zone levels for the at least one data stream are determined simultaneously.

5. The method according to claim 1, wherein for each zone, storing a zone entry in a table, the zone entry including
a starting location and a size of the zone;
a zone stamp identifying the zone based on the starting location and the size of the zone;
an identifier identifying location of the zone of the at least one data stream; and
a data stream identifier.

6. The method according to claim 1, wherein upon determination that the first zone stamp matches the second zone stamp,
delta-compressing the first zone; and
storing the delta-compressed first zone.

7. The method according to claim 1, wherein each zone has a fixed length.

8. The method according to claim 1, wherein each zone has a variable length.

9. A system comprising:
at least one programmable processor; and
a non-transitory machine-readable medium storing instructions that, when executed by the at least one programmable processor, cause the at least one programmable processor to perform operations comprising:
generating, using at least one deduplication grid server, a first zone stamp for a first data zone in a plurality of data zones contained in at least one backup data stream received by a deduplication server grid having a plurality of deduplication grid servers;
comparing, using at least one deduplication grid server, the first zone stamp to a second zone stamp, wherein the second zone stamp represents a second data zone, wherein the first and second data zones are first level data zones, and deduplicating the first data zone and the second data zone upon determination that the first zone stamp matches the second zone stamp;
selecting, using at least one deduplication grid server, a second-level first zone stamp upon determination that the first zone stamp does not match the second zone stamp, wherein the second-level first zone stamp represents a second-level first data zone contained within the first data zone; and
comparing, using at least one deduplication grid server, the second-level first zone stamp to at least one of the second zone stamp and a second-level second zone stamp, wherein the second-level second zone stamp represents a second-level second data zone, and deduplicating the second-level first zone and at least one of the second data zone and the second-level second zone based on a determination that the second-level first zone stamp matches at least one of the second zone stamp and the second-level second zone stamp.

10. The system according to claim 9, wherein the deduplicating further comprises
delta-compressing a zone in the plurality of zones; and
transmitting the delta-compressed zone across a network from a storage location to another storage location.

11. The system according to claim 9, wherein upon determination that a zone stamp of a zone does not match any other zone stamp, further comprising
data-compressing the zone; and
transmitting the data-compressed zone across a network from a storage location to another storage location.

12. The system according to claim 9, wherein the generating further comprises
processing the at least one data stream to determine all zone levels contained within the at least one data stream;
wherein all zone levels for the at least one data stream are determined simultaneously.

13. The system according to claim 9, wherein for each zone, storing a zone entry in a table, the zone entry including
a starting location and a size of the zone;
a zone stamp identifying the zone based on the starting location and the size of the zone;
an identifier identifying location of the zone of the at least one data stream; and
a data stream identifier.

14. The system according to claim 9, wherein upon determination that the first zone stamp matches the second zone stamp,
delta-compressing the first zone; and
storing the delta-compressed first zone.

15. The system according to claim 9, wherein each zone has a fixed length.

16. The system according to claim 9, wherein each zone has a variable length.

17. A computer program product comprising a non-transitory machine-readable medium storing instructions that, when executed by at least one programmable processor, cause the at least one programmable processor to perform operations comprising:
generating, using at least one deduplication grid server, a first zone stamp for a first data zone in a plurality of data zones contained in at least one backup data stream received by a deduplication server grid having a plurality of deduplication grid servers;
comparing, using at least one deduplication grid server, the first zone stamp to a second zone stamp, wherein the second zone stamp represents a second data zone, wherein the first and second data zones are first level data zones, and deduplicating the first data zone and the second data zone upon determination that the first zone stamp matches the second zone stamp;
selecting, using at least one deduplication grid server, a second-level first zone stamp upon determination that the first zone stamp does not match the second zone stamp, wherein the second-level first zone stamp represents a second-level first data zone contained within the first data zone; and
comparing, using at least one deduplication grid server, the second-level first zone stamp to at least one of the second zone stamp and a second-level second zone stamp, wherein the second-level second zone stamp represents a second-level second data zone, and deduplicating the second-level first zone and at least one of the second data zone and the second-level second zone based on a determination that the second-level first zone stamp matches at least one of the second zone stamp and the second-level second zone stamp.

18. The computer program product according to claim 17, wherein the deduplicating further comprises
delta-compressing a zone in the plurality of zones; and
transmitting the delta-compressed zone across a network from a storage location to another storage location.

19. The computer program product according to claim 17, wherein upon determination that a zone stamp of a zone does not match any other zone stamp, further comprising data-compressing the zone; and transmitting the data-compressed zone across a network from a storage location to another storage location.

20. The computer program product according to claim 17, wherein the generating further comprises processing the at least one data stream to determine all zone levels contained within the at least one data stream;

wherein all zone levels for the at least one data stream are determined simultaneously.

21. The computer program product according to claim 17, wherein for each zone, storing a zone entry in a table, the zone entry including a starting location and a size of the zone;

a zone stamp identifying the zone based on the starting location and the size of the zone;

an identifier identifying location of the zone of the at least one data stream; and a data stream identifier.

22. The computer program product according to claim 17, wherein upon determination that the first zone stamp matches the second zone stamp, delta-compressing the first zone; and storing the delta-compressed first zone.

23. The computer program product according to claim 17, wherein each zone has a fixed length.

24. The computer program product according to claim 17, wherein each zone has a variable length.

* * * * *